US010693613B2

(12) United States Patent
Kahtava et al.

(10) Patent No.: US 10,693,613 B2
(45) Date of Patent: Jun. 23, 2020

(54) TELECOMMUNICATIONS APPARATUS AND METHODS

(71) Applicant: CONVIDA WIRELESS, LLC, Wilmington, DE (US)

(72) Inventors: Jussi Kahtava, Basingstoke (GB); Derek John Richards, Basingstoke (GB)

(73) Assignee: CONVIDA WIRELESS, LLC, Wilmington, DE (US)

(*) Notice: Subject to any disclaimer, the term of this patent is extended or adjusted under 35 U.S.C. 154(b) by 0 days.

(21) Appl. No.: 14/895,774

(22) PCT Filed: May 15, 2014

(86) PCT No.: PCT/EP2014/059941
§ 371 (c)(1),
(2) Date: Dec. 3, 2015

(87) PCT Pub. No.: WO2014/198479
PCT Pub. Date: Dec. 18, 2014

(65) Prior Publication Data
US 2016/0128129 A1 May 5, 2016

(30) Foreign Application Priority Data
Jun. 13, 2013 (EP) .................................. 13171903

(51) Int. Cl.
*H04L 5/00* (2006.01)
*H04W 52/02* (2009.01)
(Continued)

(52) U.S. Cl.
CPC .............. *H04L 5/0055* (2013.01); *H04L 1/00* (2013.01); *H04L 1/1883* (2013.01);
(Continued)

(58) Field of Classification Search
None
See application file for complete search history.

(56) References Cited

U.S. PATENT DOCUMENTS 9,578,629 B2 * 2/2017 Lee ................... H04W 56/0045
2008/0186892 A1 * 8/2008 Damnjanovic ... H04W 52/0216
370/311
(Continued)

FOREIGN PATENT DOCUMENTS

WO 2009/114800 A2 9/2009
WO 2012/134219 A2 10/2012

OTHER PUBLICATIONS

"Further discussion on DRX Short Cycle Timer" Sunplus mMobile Inc., 3GPP TSG-RAN WG2 Meeting, May 2008, XP050140248, 5 pages.
(Continued)

*Primary Examiner* — Andrew C Oh
(74) *Attorney, Agent, or Firm* — Xsensus LLP

(57) ABSTRACT

A wireless telecommunications system supports a DRX operating mode for communications between a base station and terminal device, which includes a regular repeating cycle of DRX inactive periods when the terminal device monitors a downlink channel from the base station and DRX active periods when the terminal device enters a power-saving mode not monitoring the downlink channel. The terminal device transmits uplink signaling, triggering subsequent downlink signaling, that may include acknowledgement signalling for a previous downlink transmission or an uplink transmission resources request. The base station receives the uplink signalling, determines time of an upcoming DRX inactive period for the terminal device, and delays transmitting downlink signalling responding to the uplink signalling until the upcoming DRX inactive period. The terminal device enters the power saving mode after trans- (Continued)

mitting the uplink signalling and exits the power saving mode for the DRX inactive period to monitor the downlink channel for downlink signalling.

17 Claims, 9 Drawing Sheets

(51) Int. Cl.
*H04L 1/00* (2006.01)
*H04L 1/18* (2006.01)
*H04W 76/28* (2018.01)
*H04W 72/04* (2009.01)

(52) U.S. Cl.
CPC ... *H04W 52/0216* (2013.01); *H04W 72/0406* (2013.01); *H04W 76/28* (2018.02); *H04L 1/1854* (2013.01); *H04L 1/1887* (2013.01); *Y02D 70/1242* (2018.01); *Y02D 70/1262* (2018.01); *Y02D 70/21* (2018.01); *Y02D 70/24* (2018.01)

(56) References Cited

U.S. PATENT DOCUMENTS

| | | | | |
|---|---|---|---|---|
| 2008/0186944 | A1* | 8/2008 | Suzuki | H04L 1/1685 370/349 |
| 2009/0232118 | A1 | 9/2009 | Wang et al. | |
| 2009/0247203 | A1* | 10/2009 | Kuo | H04W 76/28 455/509 |
| 2009/0279466 | A1* | 11/2009 | Ji | H04W 52/0232 370/311 |
| 2009/0316593 | A1* | 12/2009 | Wang | H04W 74/0833 370/252 |
| 2010/0112956 | A1* | 5/2010 | Jeong | H04B 17/24 455/67.11 |
| 2010/0118788 | A1* | 5/2010 | Ohta | H04W 74/008 370/328 |
| 2011/0096723 | A1* | 4/2011 | Aoyama | H04W 76/12 370/328 |
| 2011/0243047 | A1* | 10/2011 | Dayal | H04W 16/14 370/311 |
| 2011/0243048 | A1* | 10/2011 | Wang | H04L 5/0051 370/311 |
| 2011/0269462 | A1* | 11/2011 | Sagfors | H04W 36/36 455/436 |
| 2011/0292854 | A1* | 12/2011 | Terry | H04L 5/001 370/311 |
| 2012/0033613 | A1* | 2/2012 | Lin | H04W 74/085 370/328 |
| 2012/0195240 | A1* | 8/2012 | Kim | H04W 52/0216 370/311 |
| 2012/0207040 | A1* | 8/2012 | Comsa | H04W 72/1215 370/252 |
| 2013/0044660 | A1* | 2/2013 | Edara | H04W 48/16 370/311 |
| 2013/0045770 | A1* | 2/2013 | Aschan | H04W 52/0216 455/522 |
| 2013/0163533 | A1* | 6/2013 | Anderson | H04W 72/04 370/329 |
| 2013/0163535 | A1* | 6/2013 | Anderson | H04L 1/0625 370/329 |
| 2013/0194990 | A1* | 8/2013 | Banister | H04W 24/10 370/311 |
| 2013/0194994 | A1* | 8/2013 | Dayal | H04W 76/048 370/311 |
| 2013/0201852 | A1* | 8/2013 | Chou | H04W 24/02 370/252 |
| 2013/0201884 | A1* | 8/2013 | Freda | H04W 72/005 370/278 |
| 2013/0223311 | A1 | 8/2013 | Wang et al. | |
| 2013/0246835 | A1* | 9/2013 | Mahajan | G06F 1/10 713/503 |
| 2013/0279383 | A1* | 10/2013 | Ye | H04W 52/02 370/311 |
| 2013/0301421 | A1* | 11/2013 | Yi | H04W 52/0216 370/241 |
| 2013/0308465 | A1* | 11/2013 | Xu | H04W 76/28 370/241 |
| 2013/0343252 | A1* | 12/2013 | Chakraborty | H04W 52/0261 370/311 |
| 2014/0022909 | A1* | 1/2014 | Mahmoud | H04L 1/0026 370/241 |
| 2014/0161111 | A1* | 6/2014 | Kim | H04L 5/0032 370/336 |
| 2014/0241227 | A1* | 8/2014 | Wu | H04W 52/0216 370/311 |
| 2014/0334456 | A1* | 11/2014 | Mukherjee | H04W 74/02 370/336 |
| 2014/0349646 | A1* | 11/2014 | Su | H04W 76/048 455/436 |
| 2015/0029920 | A1* | 1/2015 | Hoehne | H04L 1/1812 370/311 |
| 2015/0050935 | A1* | 2/2015 | Maniatis | H04W 76/068 455/437 |
| 2015/0071179 | A1* | 3/2015 | Zhang | H04W 52/04 370/329 |
| 2015/0327167 | A1* | 11/2015 | Ljung | H04W 76/068 370/311 |
| 2016/0073345 | A1* | 3/2016 | Fan | H04W 68/005 370/311 |
| 2016/0119762 | A1* | 4/2016 | Zhu | H04W 76/27 370/312 |

OTHER PUBLICATIONS

"Digital cellular telecommunications system (Phase 2+); Universal Mobile Telecommunications System (UMTS); LTE; Service requirements for Machine-Type Communications (MTC); Stage 1" ETSI TS 122 368, version 10.5.0, Release 10, Jul. 2011, pp. 1-18.
Harri Holma, et al., "LTE for UMTS OFDMA and SC-FDMA Based Radio Access", 2009, 4 pages.
"LTE; Evolved Universal Terrestrial Radio Access (E-UTRA); Radio Resource Control (RRC); Protocol specification" ETSI TS 136 331, version 11.3.0, Release 11, Apr. 2013, 348 pages.
"LTE; Evolved Universal Terrestrial Radio Access (E-UTRA); Medium Access Control (MAC) protocol specification" ETSI TS 136 321, version 11.2.0, Release 11, Apr. 2013, 58 pages.
International Search Report dated Jul. 24, 2014 for PCT/EP2014/059941 filed on May 15, 2014.

* cited by examiner

TELECOMMUNICATIONS APPARATUS AND METHODS

CROSS-REFERENCE TO RELATED APPLICATIONS

The present application is based on PCT filing PCT/EP2014/059941 filed May 15, 2014, and claims priority to European Patent Application 13 171 903.1, filed in the European Patent Office on Jun. 13, 2013, the entire contents of each of which being incorporated herein by reference.

BACKGROUND

Field

The present disclosure relates to telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architectures, are able to support more sophisticated services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage areas for these networks is expected to increase rapidly.

The anticipated widespread deployment of third and fourth generation networks has led to the parallel development of devices and applications which, rather than taking advantage of the high data rates available, instead take advantage of the robust radio interface and increasing ubiquity of the coverage area. Examples include so-called machine type communication (MTC) applications, which are typified by semi-autonomous or autonomous wireless communication devices (i.e. MTC devices) communicating small amounts of data on a relatively infrequent basis. Examples include so-called smart meters which, for example, might be located in a customer's house and periodically transmit information back to a central MTC server relating to the customer's consumption of a utility, such as gas, water, electricity and so on. Further information on characteristics of MTC-type devices can be found, for example, in the corresponding standards, such as ETSI TS 122 368 V10.530 (2011 July)/3GPP TS 22.368 version 10.5.0 Release 10) [1]. Some typical characteristics of MTC type terminal devices/MTC type data might include, for example, characteristics such as low mobility, high delay tolerance, small data transmissions, a level of predictability for traffic usage and timing (i.e. traffic profile), relatively infrequent transmissions and group-based features, policing and addressing.

Unlike a conventional third or fourth generation terminal device (such as a smartphone), an MTC-type terminal is preferably relatively simple and inexpensive and able to operate with relatively low power consumption. For example, it may often be the case that an MTC-type terminal is required to operate for an extended period of time without an external source of power. However, whilst it can be convenient for an MTC-type terminal to take advantage of the wide coverage area and robust communications interface provided by third or fourth generation mobile telecommunication networks, there are aspects of these networks which are not well suited to simple and inexpensive devices. This is because such networks are generally optimised for use by devices that require high data rates and low latency. Although power usage is an important consideration for such devices, it is to some extent of secondary concern to issues of data rates and latency. The type of functions performed by a typical MTC-type terminal on the other hand (for instance collecting and reporting back data on a relatively infrequent basis) do not typically require high data rates furthermore are typically not time-critical.

The inventors have recognised a desire to allow certain types of terminal device to operate within a mobile telecommunications network with lower power consumption than other conventional terminal devices operating within the network.

SUMMARY

According to a first aspect of the present disclosure, there is provided a method of operating a terminal device in a wireless telecommunications system which supports a discontinuous reception, DRX, operating mode, wherein the DRX mode comprises a repeating cycle of DRX inactive periods in which the terminal device monitors a downlink channel from a base station and DRX active periods during which the terminal device may enter a power saving mode and not monitor the downlink channel from the base station, the method comprising: transmitting uplink signalling to the base station, wherein the uplink signalling comprises a trigger for downlink signalling on the downlink channel to be transmitted by the base station to the terminal device, wherein the downlink signalling is associated with and transmitted in response to the uplink signalling; and waiting until a DRX inactive period of the repeating cycle of DRX inactive periods before monitoring the downlink channel for the downlink signalling transmitted in response to the uplink signalling.

According to a second aspect of the present disclosure, there is provided a terminal device for use in a wireless telecommunications system which supports a discontinuous reception, DRX, operating mode, wherein the DRX mode comprises a repeating cycle of DRX inactive periods in which the terminal device monitors a downlink channel from a base station and DRX active periods during which the terminal device may enter a power saving mode and not monitor the downlink channel from the base station, wherein the terminal device comprises: a transceiver unit configured to transmit uplink signalling to the base station of the wireless telecommunications system, wherein the uplink signalling comprises a trigger for downlink signalling on the downlink channel to be transmitted by the base station to the terminal device, wherein the downlink signalling is associated with and transmitted in response to the uplink signalling; and a processor unit configured to control the transceiver unit to wait until a DRX inactive period of the repeating cycle of DRX inactive periods before monitoring the downlink channel for the downlink signalling transmitted in response to the uplink signalling According to a third aspect of the present disclosure, there is provided a method of operating a base station in a wireless telecommunications system which supports a discontinuous reception, DRX, operating mode for terminal devices, wherein the DRX mode comprises a repeating cycle of DRX inactive periods in which terminal devices monitor a downlink channel from the base station and DRX active periods during which terminal devices do not monitor the downlink channel from the base station, the method comprising: receiving uplink signalling from a terminal device, wherein the uplink signalling comprises a trigger for downlink signalling on the downlink channel to be transmitted by the base station to the terminal device, wherein the downlink signalling is associated with and transmitted in response to the uplink signalling; and waiting until a DRX inactive period of the repeating cycle of DRX inactive periods for the terminal device before transmitting the downlink signalling in response to the uplink signalling.

According to a fourth aspect of the present disclosure, there is provided a base station for use in a wireless telecommunications system which supports a discontinuous reception, DRX, operating mode for communications terminal devices, wherein the DRX mode comprises a repeating cycle of DRX inactive periods in which terminal devices monitor a downlink channel from the base station and DRX active periods during which terminal devices do not monitor the downlink channel from the base station, wherein the base station comprises: a transceiver unit configured receive uplink signalling from a terminal device, wherein the uplink signalling comprises a trigger for downlink signalling on the downlink channel to be transmitted by the base station to the terminal device, wherein the downlink signalling is associated with and transmitted in response to the uplink signalling; and a processor unit configured to control the transceiver unit to wait until a DRX inactive period of the repeating cycle of DRX inactive periods for the terminal device before transmitting the downlink signalling in response to the uplink signalling.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
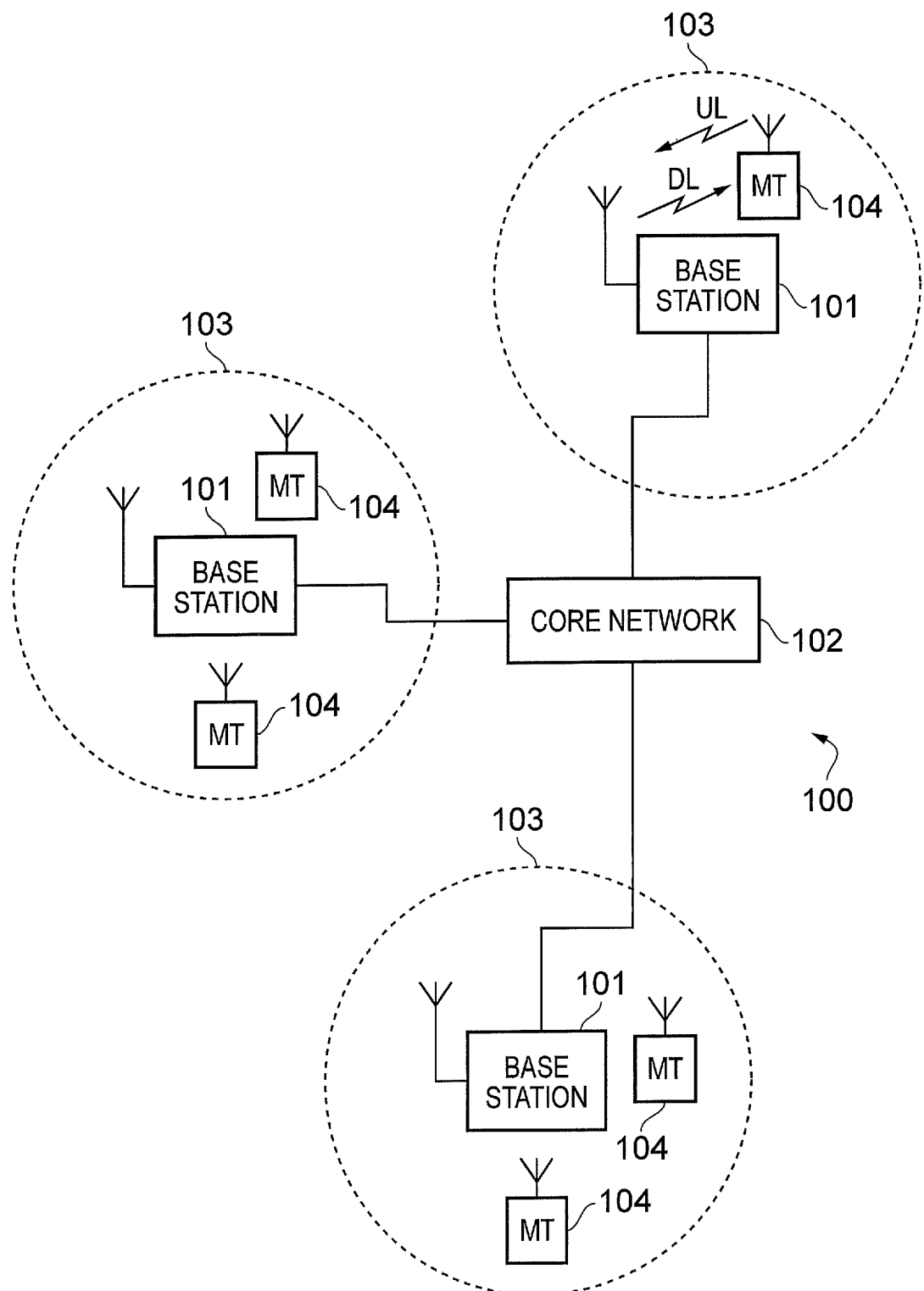
FIG. 1 schematically represents an example of a conventional LTE-type wireless telecommunication network.

FIG. 1 provides a schematic diagram illustrating some basic functionality of a wireless telecommunications network/system operating in accordance with LTE principles. Various elements of FIG. 1 and their respective modes of operation are well-known and defined in the relevant standards administered by the 3GPP® body and also described in many books on the subject, for example, Holma, H. and Toskala, A. [2].

The network includes a plurality of base stations 101 connected to a core network 102. Each base station provides a coverage area 103 (i.e. a cell) within which data can be communicated to and from terminal devices 104. Data are transmitted from base stations 101 to terminal devices 104 within their respective coverage areas 103 via a radio downlink. Data are transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, and so forth. Base stations may also be referred to as transceiver stations/nodeBs/e-NodeBs, and so forth.

Figure 2:
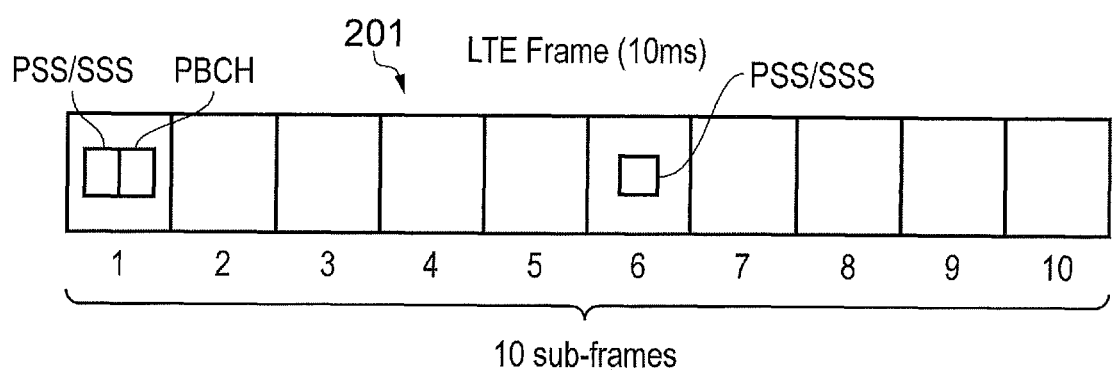
FIG. 2 schematically represents some aspects of a conventional LTE radio frame structure.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and a single carrier frequency division multiplex based interface for the radio uplink (so-called SC-FDMA). FIG. 2 shows a schematic diagram illustrating an OFDM based LTE downlink radio frame 201. The LTE downlink radio frame is transmitted from an LTE base station (known as an enhanced Node B) and lasts 10 ms. The downlink radio frame comprises ten subframes, each subframe lasting 1 ms. A primary synchronisation signal (PSS) and a secondary synchronisation signal (SSS) are transmitted in the first and sixth subframes of the LTE frame. A physical broadcast channel (PBCH) is transmitted in the first subframe of the LTE frame.

Figure 3:
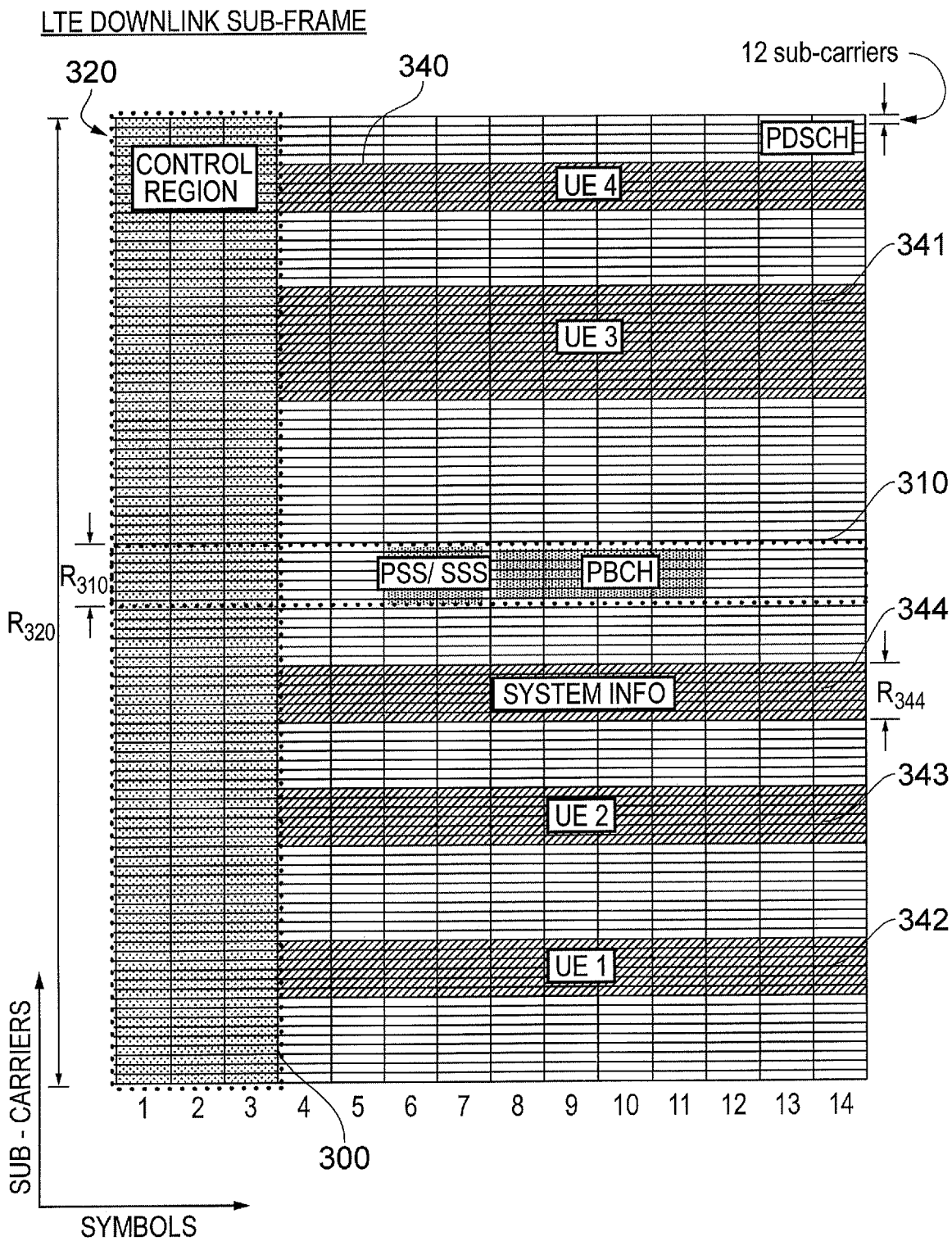
FIG. 3 schematically represents some aspects of a conventional LTE downlink radio subframe.

FIG. 3 is a schematic diagram of a grid which illustrates the structure of an example conventional downlink LTE subframe (corresponding in this example to the first, i.e. left-most, subframe in the frame of FIG. 2). The subframe comprises a predetermined number of symbols which are transmitted over a 1 ms period. Each symbol comprises a predetermined number of orthogonal sub-carriers distributed across the bandwidth of the downlink radio carrier.

The example subframe shown in FIG. 3 comprises 14 symbols and 1200 sub-carriers spread across a 20 MHz bandwidth. The smallest allocation of user data for transmission in LTE is a resource block comprising twelve sub-carriers transmitted over one slot (0.5 subframe). For clarity, in FIG. 3, each individual resource element (a resource element comprises a single symbol on a single subcarrier) is not shown, instead each individual box in the subframe grid corresponds to twelve sub-carriers transmitted on one symbol.

FIG. 3 shows resource allocations for four LTE terminals 340, 341, 342, 343. For example, the resource allocation 342 for a first LTE terminal (UE 1) extends over five blocks of twelve sub-carriers (i.e. 60 sub-carriers), the resource allocation 343 for a second LTE terminal (UE2) extends over six blocks of twelve sub-carriers and so on.

Control channel data are transmitted in a control region 300 (indicated by dotted-shading in FIG. 3) of the subframe comprising the first n symbols of the subframe where n can vary between one and three symbols for channel bandwidths of 3 MHz or greater and where n can vary between two and four symbols for channel bandwidths of 1.4 MHz. For the sake of providing a concrete example, the following description relates to carriers with a channel bandwidth of 3 MHz or greater so the maximum value of n will be 3. The data transmitted in the control region 300 includes data transmitted on the physical downlink control channel (PDCCH), the physical control format indicator channel (PCFICH) and the physical HARQ indicator channel (PHICH).

PDCCH contains control data indicating which sub-carriers on which symbols of the subframe have been allocated to specific LTE terminals. Thus, the PDCCH data transmitted in the control region 300 of the subframe shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 sub-carriers wide (corresponding to a transmission bandwidth of 1.08 MHz). The PSS and SSS are synchronisation signals that once detected allow an LTE terminal device to achieve frame synchronisation and determine the cell identity of the enhanced Node B transmitting the downlink signal. The PBCH carries information about the cell, comprising a master information block (MIB) that includes parameters that LTE terminals use to properly access the cell. Data transmitted to individual LTE terminals on the physical downlink shared channel (PDSCH) can be transmitted in other resource elements of the subframe.

FIG. 3 also shows a region of PDSCH containing system information and extending over a bandwidth of R344. A conventional LTE frame will also include reference signals which are not shown in FIG. 3 in the interests of clarity.

The number of sub-carriers in an LTE channel can vary depending on the configuration of the transmission network. Typically this variation is from 72 sub carriers contained within a 1.4 MHz channel bandwidth to 1200 sub-carriers contained within a 20 MHz channel bandwidth (as schematically shown in FIG. 3). Data transmitted on the PDCCH, PCFICH and PHICH is typically distributed on the sub-carriers across the entire bandwidth of the subframe to provide for frequency diversity.

A terminal device in radio resource control (RRC) connected mode receives and decodes PDCCH in subframes to identify if there are any transmission resource allocations (resource grants) for the terminal device in the subframe. A terminal device is thus required to receive and decode PDCCH for all subframes in which the terminal device might potentially be allocated transmission resources, even though in many of these subframes there might not be any data for the terminal device. Resources used in receiving and decoding PDCCH in subframes for which there is no data for the terminal device are in effect wasted. With this in mind, a known technique for lowering power consumption in LTE-type terminals is to restrict the number of subframes for which a terminal device should monitor PDCCH using discontinuous reception, DRX, techniques. DRX techniques involve a terminal device and a base station in effect agreeing times (e.g. particular subframes) during which the terminal device will be monitoring downlink physical channels and the base station can expect the terminal device to receive transmissions sent to it. The terminal device thus knows that outside these agreed times there are subframes when it will not receive transmissions from the base station, and the terminal device may conserve power during these subframes by not receiving and decoding PDCCH.

Thus, a DRX mode comprises alternating periods during which a terminal device could potentially receive data from the base station (and hence should monitor PDCCH) and periods during which the terminal device will not receive data (and hence need not monitor PDCCH to save power). The subframes in which the terminal device could receive data from the base station may be referred to as DRX inactive periods and the subframes in which the terminal device should not receive data from the base station may be referred to a DRX active periods.

In a conventional LTE network the timings of DRX inactive periods and DRX active periods for a given terminal device in RRC Connected mode are defined by various parameters (which may be defined in terms of numbers of subframes). There are six basic DRX parameters that define the pattern of DRX inactive and DRX active periods in LTE. These are:

(i) DRX Cycle
(ii) On Duration Timer
(iii) DRX Short Cycle
(iv) DRX Short Cycle Timer
(v) DRX Inactivity Timer
(vi) DRX Retransmission Timer FIGS. 4 to 7 are schematic diagrams showing how the above-identified DRX parameters are defined on a representative time axis t. (The timings in these figures are represented for clarity of explanation and are not necessarily shown to scale.)

Figure 4:
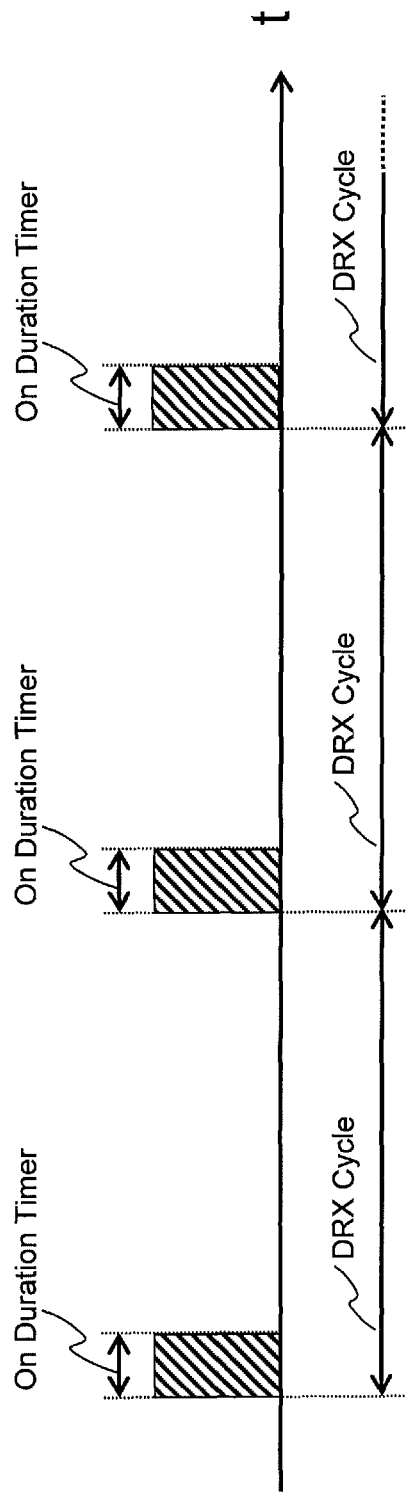
FIGS. 4 to 6 schematically represent some aspects of a conventional discontinuous reception (DRX) mode of a wireless telecommunication network.

FIG. 4 schematically represents the basic underlying DRX cycle with periods when the terminal device receiver circuitry is active and monitoring PDCCH (DRX inactive) schematically represented by diagonally shaded blocks on the time axis t. This aspect of the LTE DRX mode may be referred to herein as the "normal" or "basic" DRX cycle/mode. The timings relating to this normal DRX cycle are set by the parameters DRX Cycle and On Duration Timer as schematically represented in the figure. Thus, in the normal DRX mode a terminal device activates its receiver circuitry and monitors PDCCH for a period corresponding to On Duration Timer once every DRX Cycle.

A relatively long basic DRX cycle allows for more power to be conserved. However, a long basic DRX cycle also results in increased latency because there are longer periods of time during which the terminal device is not monitoring PDCCH (and hence cannot be contacted). To address this LTE provides for two durations of DRX cycle, namely the basic/normal DRX cycle represented in FIG. 4, and a shorter DRX cycle. The short DRX cycle is broadly similar to the normal DRX cycle in overall structure in that it also comprises a regular pattern of DRX inactive and DRX active periods. However, the short DRX cycle adopts a shorter repeat period. The operation of the short DRX cycle is governed by the parameters DRX Short Cycle and DRX Short Cycle Timer. DRX Short Cycle is the repeat period for the short DRX cycle (DRX Cycle is an integer multiple of DRX Short Cycle in LTE). DRX Short Cycle timer defines the number of short DRX cycle periods before the normal DRX cycle is entered. (In LTE the On Duration Timer applies for both short and normal DRX cycles.)

Thus a terminal device which has concluded communicating with a network initially enters the short DRX cycle mode before entering the longer/normal DRX cycle mode (assuming no communications are made during the period established by DRX Short cycle Timer). The principle underlying this approach in LTE is a recognition that a terminal device is more likely to need to re-communicate with a network relatively soon after a previous communication, and so a shorter DRX cycle can be used to reduce latency for a period after a recent communication. If, however, the terminal device does not re-communicate with the base station during this period, the terminal device may then drop into the longer normal DRX cycle.

Figure 5:
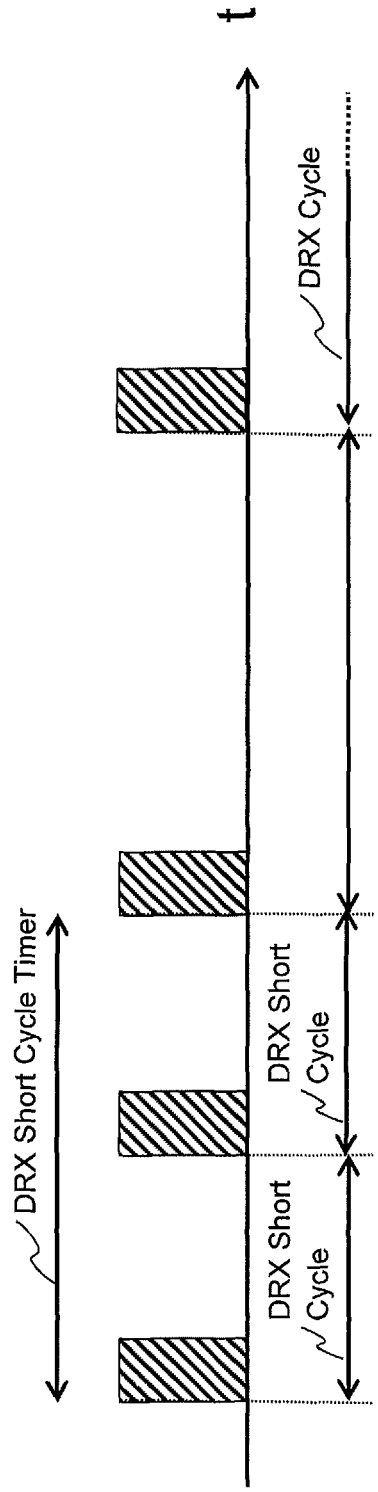

FIG. 5 schematically represents some aspects of the short DRX cycle in LTE. FIG. 5 is similar to, and will be understood from, FIG. 4, except the left-most DRX cycle in FIG. 4 is replaced in FIG. 5 with a section of short DRX cycle mode. In the example of FIG. 5 the DRX Short Cycle is one-half the normal DRX Cycle. The DRX Short Cycle Timer in this particular timing example is taken to expire at the end of the second DRX Short Cycle represented in FIG. 5 such that the normal (longer) DRX cycle, as represented in FIG. 4, picks up from this point.

In summary, in the absence of any transmissions to the terminal device or uplink scheduling requests, the DRX mode comprises a number of short cycles followed by a longer DRX opportunity until the next DRX cycle begins.

Figure 6:
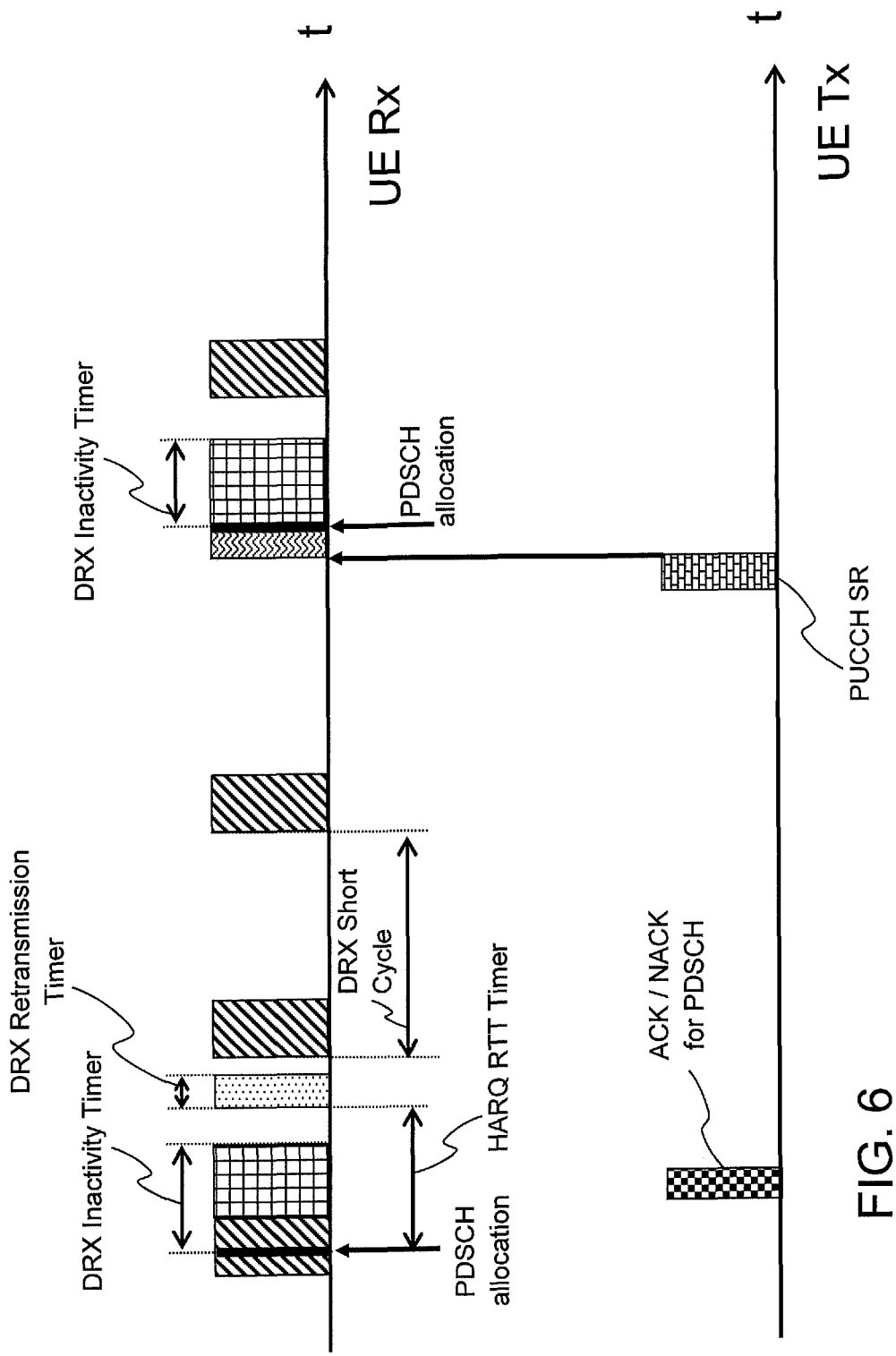

However, in addition to the regular and repeating DRX inactive periods during which a terminal device monitors PDCCH as represented in FIGS. 4 and 5, LTE defines various non-repeating/irregular DRX inactive periods during which a terminal device is required to monitor PDCCH, and these are schematically represented in FIG. 6.

The upper part of FIG. 6 is a timeline representing various periods during which a terminal device receiver is active while the lower part of FIG. 6 is a corresponding timeline representing periods during which the terminal device transmitter is active.

As with FIGS. 4 and 5, the upper part of FIG. 6 uses blocks to identify times at which the terminal device is required to monitor PDCCH.

Here it is assumed for the period of time prior to that represented in FIG. 6 the terminal device is in the normal DRX mode such as represented in FIG. 4, but in the left-most DRX inactive period represented in FIG. 6, the terminal device receives a downlink communication on PDSCH. This may be any conventional downlink communication.

In LTE, the receipt of a downlink communication initiates a timer during which a terminal device is required to continue monitoring PDCCH, even if the On Duration Timer associated with the normal regular and repeating DRX cycle expires. This timer is set by the DRX Inactivity Timer parameter. Thus, the DRX Inactivity Timer causes the DRX inactive period during which the terminal device must monitor PDCCH to be extended beyond the "normal" DRX inactive period if a downlink communication is received during the "normal" inactive period. This is schematically represented by the grid shading in FIG. 6 for the leftmost DRX inactive period. If any further communications are received by the terminal device during the extended DRX inactive period, the DRX Inactivity Timer is reset, thereby extending the DRX inactive period further still. Only once the DRX Inactivity Timer expires can the terminal device re-enter DRX active mode.

In response to the PDSCH allocation represented in the left-most DRX inactive period in the upper part of FIG. 6, the terminal device will, in accordance with conventional techniques, transmit uplink acknowledgement signalling (ACK/NACK signalling) for the (schematically represented in the lower part of FIG. 6 by the chequer-board shaded block). In LTE the terminal device sends its acknowledgement signalling four subframes after the subframe containing the relevant PDSCH allocation. If the terminal device is unable to properly decode the PDSCH allocation it will transmit negative acknowledgement (NACK) signalling. In response to this the base station schedules a retransmission of the information comprising the PDCCH allocation. In LTE the base station has some flexibility with regards to rescheduling the retransmission. The base station cannot reschedule the transmission before a time set by HARQ RTT Timer (e.g. eight subframes) after the initial PDSCH allocation has expired, but the base station does not need to schedule the retransmission in the subframe immediately after HARQ RTT Timer expires.

Accordingly, if a terminal device cannot properly decode a PDSCH allocation and transmits corresponding negative acknowledgement signalling, the terminal device must reactivate its receiver circuitry when HARQ RTT Timer expires in the expectation that the base station will at some stage after HARQ RTT Timer expires schedule a retransmission of the information sent in the previous PDSCH allocation. The parameter DRX Retransmission Timer specifies the amount of time the terminal device must remain active after expiry of HARQ RTT Timer to monitor PDCCH for a resource allocation for a retransmission of the earlier PDSCH allocation that was negatively acknowledged. This period of time during which the terminal device cannot remain in DRX active mode is schematically resented in FIG. 6 by the block with dotted shading. Although not shown in FIG. 6 for the purposes of clarity, a retransmission of a previous negatively-acknowledged PDSCH allocation may be expected to occur during the period corresponding to the DRX Retransmission Timer, and this will require the terminal device to remain in an active mode monitoring PDCCH waiting for the retransmission to be received on PDSCH or for the DRX Retransmission Timer to expire.

The additional periods during which the terminal device must monitor PDCCH under the DRX Inactivity Timer (grid shading in FIG. 6) and DRX Retransmission Timer (dot shading in FIG. 6) are over and above the regular short cycle and normal cycle DRX periods. The periods associated with the regular are repeating DRX cycles therefore remains, as indicated by the diagonal shaded blocks in FIG. 6 (with the short DRX cycle mode being triggered by the PDSCH allocation).

Thus, the left-hand half of FIG. 6 represents how the repeating and regular pattern of active and inactive DRX periods of FIGS. 4 and 5 becomes disrupted when a terminal device receives downlink communications and how this result in additional periods of time during which the terminal device must monitor PDCCH.

The right-hand half of FIG. 6 represents another situation which results in a terminal device needing to monitor PDCCH outside the repeating and regular pattern of active and inactive DRX periods such as represented in FIGS. 4 and 5. This is triggered by the terminal device making a scheduling request (SR) with an uplink transmission on the physical uplink control channel (PUCCH). A terminal device will typically do this when it wishes to request uplink resources because the terminal device has data it needs to communicate to the network. The PDCCH SR is schematically represented in the lower part of FIG. 6 by the brick-shaded block.

When a terminal device transmits a SR on PUCCH it can expect to receive a response from the base station on PDSCH. In order to receive the response, the terminal device must therefore monitor PDCCH for the PDSCH allocation message. That is to say, on sending the PUCCH SR, the terminal device must exit DRX active mode. This is schematically represented in FIG. 6 by the by the block with zigzag shading. Once the terminal device receives the PDSCH allocation in response to the PUCCH SR, the DRX Inactivity Timer is restarted as discussed above, and as schematically represented in the right-hand part of the upper timeline in FIG. 6.

Thus, the right-hand half of FIG. 6 represents how the repeating and regular pattern of active and inactive DRX periods of FIGS. 4 and 5 also becomes disrupted when a terminal device requests uplink resources and how this again results in additional periods of time during which the terminal device must monitor PDCCH.

The parameters DRX Cycle, On Duration Timer, DRX Short Cycle, DRX Short Cycle Timer, DRX Inactivity Timer, and DRX Retransmission Timer which define the DRX timings are shared between the base station and terminal device through RRC signalling in accordance with conventional techniques. The starting point of the DRX cycle (i.e. what might be termed its phase relative to the system frame numbering) is determined by DRX Start Offset which is communicated through RRC signalling. Thus both the terminal device and the network can determine from the system frame number the particular subframes when the terminal device receiver should be active and listening to PDCCH. This allows the base station to schedule transmissions to the base station at the appropriate times and the terminal device to activate its receiver circuitry to receive any such transmissions at the appropriate times.

Further information on conventional DRX operation in LTE-type networks can be found in the relevant standards. See, for example, ETSI TS 136 331 V11.3.0 (2013 April)/3GPP TS 36.331 version 11.3.0 Release 11 [3], and ETSI TS 136 321 V11.2.0 (2013 April)/3GPP TS 36.321 version 11.2.0 Release 11 [4].

In practice, the DRX opportunities (i.e. the times in which the terminal device need not monitor PDCCH—the DRX active periods) can be significantly less than the basic DRX cycle would suggest. This is apparent from a comparison of FIG. 6 with FIG. 4, whereby FIG. 6 shows a significant increase in the amount of time during which the terminal device must monitor PDCCH (i.e. the periods represented by the grid, dot and zigzag shaded blocks) over and above the times during which the terminal device must monitor PDCCH in accordance with the basic regular and repeating DRX cycles (i.e. the periods represented by the diagonal shaded blocks)

The inventors have recognised for certain types of terminal device, such as MTC-type devices, the power costs associated with the loss of various DRX opportunities such as described above can represent a relatively significant increase in their power consumption. For example, a particular example MTC-type device might be expected to operate with its receiver circuitry activated for only a few seconds a day. In this case, even small increases in the amount of time during which the device must monitor PDCCH can represent a significant relative increase in power consumption.

Figure 7:
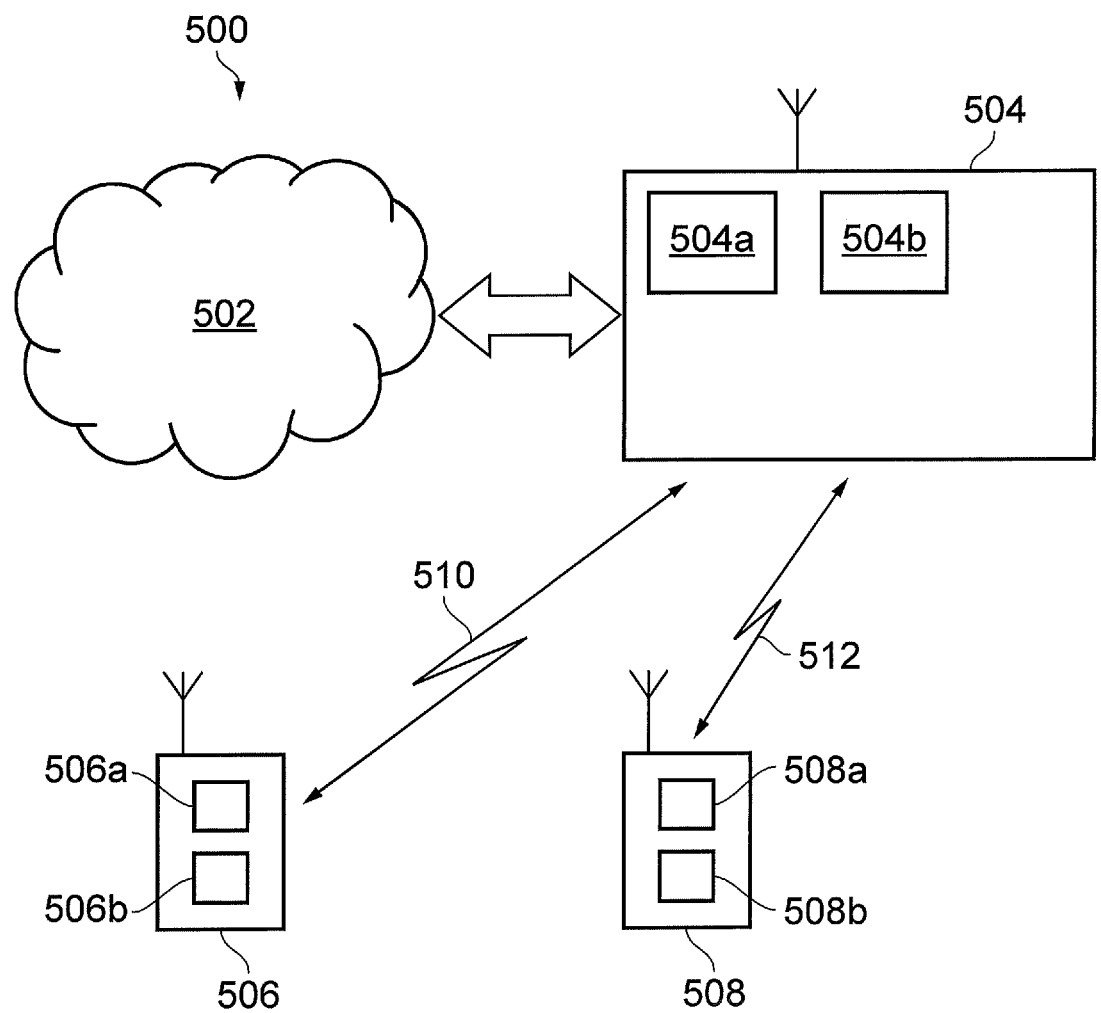
FIG. 7 schematically represents some aspects of a wireless telecommunication network configured to operate in accordance with certain embodiments of the present disclosure.

FIG. 7 schematically shows a telecommunications system 500 according to an embodiment of the present disclosure. The telecommunications system 500 in this example is based broadly around an LTE-type architecture. As such many aspects of the operation of the telecommunications system 500 are known and understood and are not described here in detail in the interest of brevity. Operational aspects of the telecommunications system 500 which are not specifically described herein may be implemented in accordance with any known techniques, for example according to the current LTE-standards.

The telecommunications system 500 comprises a core network part (evolved packet core) 502 coupled to a radio network part. The radio network part comprises a base station (evolved-nodeB) 504 coupled to a plurality of terminal devices. In this example, two terminal devices are shown, namely a first terminal device 506 and a second terminal device 508. It will of course be appreciated that in practice the radio network part may comprise a plurality of base stations serving a larger number of terminal devices across various communication cells. However, only a single base station and two terminal devices are shown in FIG. 7 in the interests of simplicity.

As with a conventional mobile radio network, the terminal devices 506, 508 are arranged to communicate data to and from the base station (transceiver station) 504. The base station is in turn communicatively connected to a serving gateway, S-GW, (not shown) in the core network part which is arranged to perform routing and management of mobile communications services to the terminal devices in the telecommunications system 500 via the base station 504. In order to maintain mobility management and connectivity, the core network part 502 also includes a mobility management entity (not shown) which manages the enhanced packet service, EPS, connections with the terminal devices 506, 508 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 502 to an external packet data network, for example the Internet. As noted above, the operation of the various elements of the communications system 500 shown in FIG. 7 may be broadly conventional apart from where modified to provide functionality in accordance with embodiments of the present disclosure as discussed herein.

In this example, it is assumed the first terminal device 506 is a conventional smartphone type terminal device communicating with the base station 504 in a conventional manner. This conventional terminal device 506 comprises a transceiver unit 506a for transmission and reception of wireless signals and a processor unit 506b configured to control the device 506. The processor unit 506b may comprise a processor unit which is suitably configured/programmed to provide the desired functionality using conventional programming/configuration techniques for equipment in wireless telecommunications systems. The transceiver unit 506a and the processor unit 506b are schematically shown in FIG. 7 as separate elements. However, it will be appreciated that the functionality of these units can be provided in various different ways, for example using a single suitably programmed general purpose computer, or suitably configured application-specific integrated circuit(s)/circuitry. As will be appreciated the conventional terminal device 506 will in general comprise various other elements associated with its operating functionality.

In this example, it is assumed the second terminal device 508 is a machine-type communication (MTC) terminal device 504 adapted to support operation in accordance with embodiments of the present disclosure when communicating with the base station 504. As discussed above, machine-type communication terminal devices can in some cases be typically characterised as semi-autonomous or autonomous wireless communication devices communicating small amounts of data. Examples include so-called smart meters which, for example, may be located in a customer's house and periodically transmit information back to a central MTC server data relating to the customer's consumption of a utility such as gas, water, electricity and so on. MTC devices may in some respects be seen as devices which can be supported by relatively low bandwidth communication channels having relatively low quality of service (QoS), for example in terms of latency. It is assumed here the MTC terminal device 508 in FIG. 7 is such a device.

The MTC device 508 comprises a transceiver unit 508a for transmission and reception of wireless signals and a processor unit 508b configured to control the MTC device 508. The processor unit 508b may comprise various sub-units, for example a DRX control unit, for providing functionality in accordance with embodiments of the present disclosure as explained further herein. These sub-units may be implemented as discrete hardware elements or as appropriately configured functions of the processor unit. Thus the processor unit 508b may comprise a processor unit which is suitably configured/programmed to provide the desired functionality described herein using conventional programming/configuration techniques for equipment in wireless telecommunications systems. The transceiver unit 508a and the processor unit 508b are schematically shown in FIG. 7 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the MTC device 508 will in general comprise various other elements associated with its operating functionality.

The base station 504 comprises a transceiver unit 504a for transmission and reception of wireless signals and a processor unit 504b configured to control the base station 504 to operate in accordance with embodiments of the present disclosure as described herein. The processor unit 506b may again comprise various sub-units, such as a scheduling unit, for providing functionality in accordance with embodiments of the present disclosure as explained further below. These sub-units may be implemented as discrete hardware elements or as appropriately configured functions of the processor unit. Thus, the processor unit 504b may comprise a processor unit which is suitably configured/programmed to provide the desired functionality described herein using conventional programming/configuration techniques for equipment in wireless telecommunications systems. The transceiver unit 504a and the processor unit 504b are schematically shown in FIG. 7 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the base station 504 will in general comprise various other elements associated with its operating functionality.

Thus, the base station 504 is configured to communicate data with both the conventional terminal device 506 and the terminal device 508 according to an embodiment of the disclosure over respective communication links 510, 512. The base station 504 is configured to communicate with the conventional terminal device 506 over the associated radio communication link 510 following the established principles of LTE-based communications, and in particular using conventional DRX procedures. However, communications between the base station 504 and the MTC terminal device 508 operate using modified DRX procedures in accordance with certain embodiments of the present disclosure as described herein. Thus, one aspect of certain embodiments of the disclosure is that the base station is configured to operate by communicating with different classes of terminal device (e.g. a first class of terminal device, for example comprising conventional LTE terminal devices, such as smartphones, and a second class of terminal device, for example comprising MTC-type terminal devices) using different discontinuous reception procedures/modes. That is to say, a base station may operate to communicate with a first class (group/type) of terminal device in accordance with a first DRX mode associated first DRX mode timings and to communicate with a second class (group/type) of terminal device in accordance with a second DRX mode associated second DRX mode timings, the rules governing the DRX mode timings of the second DRX mode being different from those of the first DRX mode. Whether or not a particular terminal device or base station supports modified DRX procedures in accordance with embodiments of the present disclosure may be established in accordance with conventional techniques for sharing terminal device and base station capability information in wireless telecommunications network, for example based on signalling exchange during a RRC connection establishment procedure.

In this example it is assumed the base station communicates with the first class of terminal device using conventional DRX procedures, for example, following the principles schematically represented in FIGS. 4 to 7.

Figure 8:
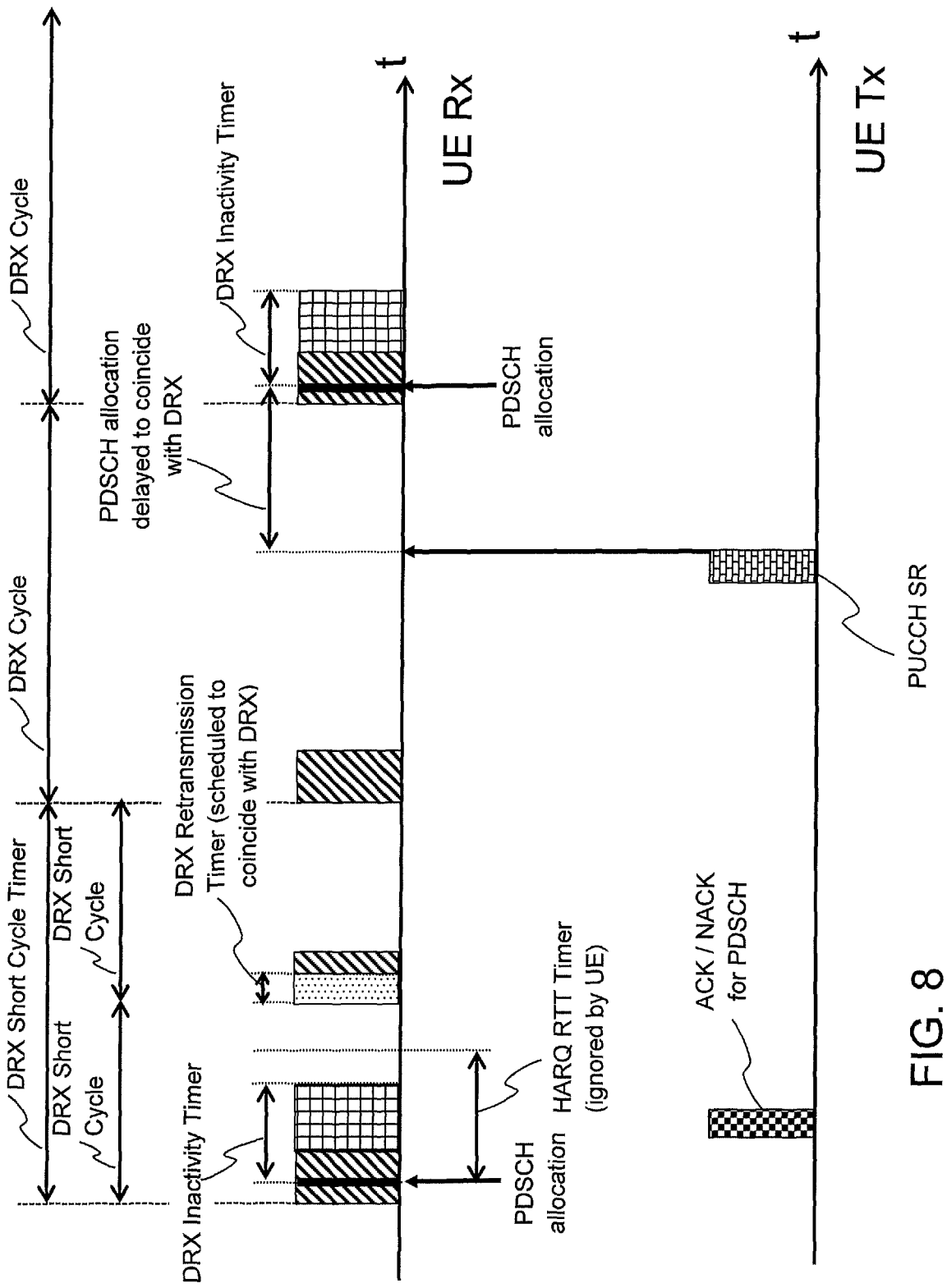
FIGS. 8 and 9 schematically represent some aspects of a discontinuous reception (DRX) mode of a wireless telecommunication network in accordance with examples of the present disclosure.

FIG. 8 is similar to, and will be understood from, FIG. 6. However, whereas FIG. 6 represents aspects of DRX timings in accordance with conventional LTE techniques, FIG. 8 represents aspects of DRX timings in accordance with an embodiment of the present disclosure in the wireless telecommunications system 500 of FIG. 7. As with FIG. 6, FIG. 8 represents some events associated with acknowledgment signalling (to the left-hand side of the figure) and scheduling request signalling (to the right-hand side) and these are both represented in the same figure purely for simplicity.

For this particular example implementation it is assumed the DRX procedures are modified in accordance with an embodiment of the disclosure in a way which nonetheless makes use of the same parameters as are used for configuring conventional DRX procedures, such as discussed above. That is to say, DRX procedures for the terminal device 508 operating in accordance with this embodiment of the disclosure are also governed by parameters DRX Cycle, On Duration Timer, DRX Short Cycle, DRX Short Cycle Timer, DRX Inactivity Timer, and DRX Retransmission Timer. These parameters may be the same for the MTC-type terminal device 508 operating in accordance with an embodiment of the disclosure as for the conventional-type terminal device 506. The particular values for the parameters may be established in the network and shared between the base station and the respective terminal devices 506, 508 in accordance with conventional techniques, for example through RRC signalling. Furthermore, the respective start points of the different DRX cycles for the different terminal devices operating in the network may be established in the same way as with conventional DRX procedures, that is based on the DRX Start Offset determined by RRC signalling.

In accordance with the example implementation represented in FIG. 8 it is assumed some aspects of the DRX procedures for the terminal device 508 are the same as for the conventional DRX procedures discussed above. In particular, the regular and repeating DRX inactive periods governed by the parameters DRX Cycle, On Duration Timer, DRX Short Cycle and DRX Short Cycle Timer are assumed to be the same for the MTC-type terminal device 508 operating in accordance with an embodiment of the disclosure as for the conventional-type terminal device 506 operating in accordance with conventional DRX procedures. Furthermore, in accordance with the example implementation represented in FIG. 8 it is assumed the DRX procedures for the terminal device 508 use the DRX Inactivity Timer in the same way as for conventional DRX procedures discussed above with reference to FIG. 6.

Aspects of the operation of the MTC-type terminal device 508 with regards to it transmitting acknowledgement signalling (ACK/NACK) and scheduling request signalling (PUCCH SR) are also assumed to be conventional in accordance with this example implementation.

Thus, there are various timings and events represented in FIG. 8 which match with, and will be understood from, corresponding timings and events represented in FIG. 6. In particular, this is the case for:

(i) the timings and events associated with the regular and repeated DRX inactive periods (represented in FIGS. 6 and 8 by the diagonal shaded blocks and governed by DRX Cycle, On Duration Timer, DRX Short Cycle and DRX Short Cycle Timer);

(ii) the extensions to the DRX inactive periods following a PDSCH allocation (represented by the grid shaded blocks and governed by DRX Inactivity Timer);

(iii) the acknowledgment uplink signalling (represented by the chequer-board shaded blocks and governed by HARQ procedures); and (iv) the scheduling request (SR) uplink signalling (represented by the brick shaded blocks and governed by PUCCH procedures).

Thus, the elements in FIG. 8 represented by diagonal shading, grid shading, chequer-board shading, and brick shading match the correspondingly-shaded elements in FIG. 6 and follow conventional LTE procedures and timings. For ease of comparison the specific timing for the PDSCH allocation in the left-most DRX inactive period and the specific timing for the example PUCCH SR are assumed to be the same relative to the respective timelines represented in FIGS. 6 and 8. It will of course be appreciated that in general the PDSCH allocation and PUCCH SR elements of the respective figures can occur at other times according to base station scheduling decisions and terminal device uplink requirements.

However, while several aspects of the DRX procedures represented in FIG. 8 in accordance with this example embodiment of the disclosure are similar to those represented in FIG. 6 and follow conventional DRX techniques, there are differences in how the base station and terminal device operate in response to uplink signalling being transmitted by the terminal device. In particular there are differences in how DRX procedures in accordance with an example of the present disclosure operate in response to uplink signalling from the terminal device which triggers subsequent downlink signalling from the base station. One example of such uplink signalling is negative acknowledgement signalling (checker-board shading in FIG. 8) which triggers a retransmission of a previous PDSCH allocation in accordance with HARQ procedures. Another example of such uplink signalling is PUCCH SR signalling (brick shading in FIG. 8) which triggers a PDSCH allocation in accordance with the uplink scheduling procedures.

As regards uplink acknowledgement signalling, and as discussed above with reference to FIG. 6, in accordance with conventional DRX procedures, the DRX active mode cannot be used for a period defined by DRX Retransmission Timer starting after the HARQ RTT Timer has expired following a PDSCH allocation which is negatively acknowledged. This is because the terminal device needs to monitor PDCCH for this period for a retransmission of the negatively-acknowledged PDSCH allocation. This period corresponds with that represented by the dot shaded block in FIG. 6. A base station receiving a negative-acknowledgement in respect of a previous PDCCH allocation in accordance with conventional DRX procedures therefore knows it may schedule a retransmission within this window corresponding to the period of time during which the terminal device is required to monitor PDCCH for a PDSCH allocation associated with the retransmission.

However, in accordance with certain embodiments of the present disclosure such as represented in FIG. 8, the DRX procedure is modified such that the DRX active period may be maintained following expiry of the HARQ RTT Timer until the beginning of the next regular and repeated DRX inactive period associated with DRX Cycle (or DRX Short Cycle as the case may be). This is schematically represented in FIG. 8 by a period of time corresponding to the DRX Retransmission Timer (dot shaded block) in effect being shifted/delayed in accordance with an embodiment of the disclosure to overlap with the next DRX active period following the regular and repeated DRX cycle after expiry of the HARQ RTT Timer. In effect the base station 504 and the terminal device 508 are configured to ignore the expiry of the HARQ RTT Timer to allow the DRX active mode to be retained until the next regular DRX inactive period. The base station 504 therefore does not schedule a retransmission until the next regular DRX inactive period, and the terminal device 508 need not monitor PDCCH until the next regular DRX inactive period. For ease of representation, the DRX Retransmission Timer period (dot shading in FIG. 8) is schematically shown as being retained and overlapping the regular DRX inactive period (diagonal shading). In this example the DRX Retransmission Timer is represented as being shorter than the On Duration Timer, but this is not necessarily always the case. Thus, the base station 504 and terminal device 508 are configured to wait until the next DRX active period that would otherwise arise (i.e. the beginning of the next DRX cycle) before the base station schedules retransmissions for the terminal device. This allows the terminal device 508 to remain in a power saving mode, for example a mode in which it does not monitor PDCCH, for longer than is possible with conventional DRX procedures such as discussed above with reference to FIG. 6.

As regards uplink SR signalling, and as discussed above with reference to FIG. 6, in accordance with conventional DRX procedures, the DRX active mode cannot be used following an uplink scheduling request on PUCCH. This is because the terminal device needs to monitor PDCCH following PUCCH SR uplink signalling for a PDSCH allocation from the base station sent in response to the PUCCH SR. This period corresponds with that represented by the zigzag shaded block in FIG. 6. A base station receiving a scheduling request (PUCCH SR) in accordance with conventional DRX procedures therefore knows it may schedule a response transmission in subframes immediately following receipt of the scheduling request.

However, in accordance with certain embodiments of the present disclosure such as represented in FIG. 8, the DRX procedure is modified such that the DRX active period may be maintained following scheduling request uplink signalling being sent by the terminal device 508 to the base station 504 until the beginning of the next regular and repeated DRX inactive period associated with DRX Cycle (or DRX Short Cycle as the case may be). This is apparent in FIG. 8 by their being no DRX inactive period corresponding to the zigzag shaded block in FIG. 6 following the uplink scheduling request. Instead, in accordance with certain example embodiments of the disclosure the base station waits until the next DRX active period following the regular and repeated DRX cycle. In effect the base station 504 and the terminal device 508 are configured to ignore the impact the PUCCH SR would have on conventional DRX procedures to allow the DRX active mode to be retained until the next regular DRX inactive period. The base station 504 therefore does not schedule a transmission in response to the scheduling request until the next regular DRX inactive period, and the terminal device 508 need not monitor PDCCH for the expected response to the scheduling request until the next regular DRX inactive period. Thus, in effect the base station 504 and terminal device 508 are configured to wait until the next DRX active period that would otherwise arise (i.e. the beginning of the next DRX cycle) before exiting the DRX active mode. This allows the terminal device to remain in a power saving mode, for example a mode in which it does not monitor PDCCH, for longer than is possible with conventional DRX procedures such as discussed above with reference to FIG. 6.

Thus, in accordance with the principles described above, a modified DRX procedure may be adopted which allows a terminal device to remain in a power-saving mode for longer than would otherwise be the case. This approach introduces an element of increased latency as the terminal device waits for longer than it would conventionally do to monitor for a response to its uplink signalling. However, in some cases, for example for MTC-type devices, power conservation may be considered a relatively more significant concern than latency. In these cases an approach in accordance with embodiments of the present disclosure provides a mechanism that allows for reduced power consumption. Furthermore, in accordance with embodiments of the present disclosure this can be obtained within the framework of a conventional LTE network, and in particular an LTE network that also supports communications with terminal devices which operate using conventional DRX procedures rather than modified DRX procedures described herein.

Regarding the issue of latency, certain embodiments may provide a mechanism whereby a terminal device can indicate it desires a more rapid response to its uplink signalling. For example, a terminal device may be configured to transmit the relevant uplink signalling with a characteristic that indicates whether the modified DRX procedures as described herein should be followed (thereby allowing increased power saving) or whether conventional DRX procedures should be followed (thereby allowing a faster response).

For example, a terminal device 508 operating in accordance with an embodiment of the present disclosure may determine that it requires fast access to uplink resources and does not want the base station to wait until the beginning of the next regular DRX cycle before responding to the terminal device's scheduling request (the underlying reason why the terminal device needs fast access is not significant to the principles described herein). The terminal device may thus transmit the PDCCH scheduling request with a characteristic that the base station is configured to identify and recognise as an indication the terminal device intends to follow the conventional DRX procedures and will monitor PDCCH following transmission of the scheduling request without waiting until the next regular DRX inactive period. The base station may thus respond by scheduling a reply to the terminal device scheduling request before the next regular DRX inactive period.

The characteristic used to indicate whether or not the terminal device wishes the base station to wait until the beginning of the next regular DRX cycle before responding to the uplink signalling can take various forms. In some cases a new flag may be defined and communicated to the base station in association with the relevant uplink signalling to indicate whether or not the base station should delay responding until the beginning of the next DRX cycle. In other cases, the characteristic may be based on the reuse of existing LTE signalling. For example, in current LTE systems a terminal device uses PUCCH format 2 to report channel state information (CSI). Current LTE specifications stipulate that a terminal device should not report CSI during DRX active periods (terminal device receiver inactive periods). Thus, a wireless telecommunications system may be adapted in accordance with an embodiment of the present disclosure to in effect allow the terminal device to initiate PUCCH format 2 uplink signalling during DRX active period to make a scheduling request. The base station receiving the PUCCH format 2 uplink signalling from a terminal device during a DRX active period for the terminal device may be configured to recognise the signalling is not a conventional CQI (because it has been sent at the "wrong" time), and should instead be interpreted as a scheduling request. Thus, the terminal device may make a scheduling request by sending a conventional scheduling request or make a scheduling request through PUCCH format 2 uplink signalling during a DRX active period. Whichever mechanism the terminal device chooses may be used to indicate whether or not the scheduling request should be dealt with in accordance with conventional DRX procedures (no delay in base station response) or modified DRX procedures (delay in base station response until beginning of next DRX cycle). Thus, in one example implementation, if the base station 504 receives a conventionally-formatted scheduling request from the terminal device 508 it may be configured to respond in accordance with conventional DRX procedures, whereas if the base station receives what is pre-defined as being considered a non-conventional scheduling request (for example PUCHH format 2 signalling during a DRX active period), it may be configured to respond in accordance with modified DRX procedures such as described above with reference to FIG. 8. That is to say, the characteristic used to indicate which DRX procedure should be followed may correspond to a selected format for the uplink signalling. Naturally, other is uplink signalling that should not normally be used in DRX active periods could be used in the same way to distinguish between which DRX procedures/timings should be used for downlink signalling sent in response to the uplink signalling.

Similar principles can be adopted to cause a base station to respond more quickly to negative acknowledgement signalling than it would otherwise do following the principles described above with reference to FIG. 8 in accordance with an embodiment of the present disclosure. That is to say, the acknowledgement uplink signalling from the terminal device may be associated with a characteristic selected by the terminal device to indicate whether or not the base station should adopt conventional DRX procedures or modified DRX procedures when scheduling a retransmission in response to the negative acknowledgement signalling.

During normal terminal device operation in an LTE wireless telecommunications network the terminal device is configured to transmit sounding reference signals (SRS) to assist radio resource management functions in the network. In accordance with modified DRX procedures such as described herein, a base station may delay transmitting downlink signalling to a terminal device in response to uplink signalling received from the terminal device for a relatively long period (for example, until the beginning of a subsequent DRX cycle). In this case it may be considered beneficial in some implementations for the base station to receive SRS signalling from the terminal device shortly before the beginning of the subsequent DRX cycle to assist the base station in its scheduling decisions.

Conventionally, a terminal device may be configured to transmit periodic SRS signalling (type-0 triggered SRS signalling) with intervals of up to 320 ms, but these are not transmitted during DRX active periods. A terminal device may also be caused to transmit aperiodic SRS signalling (type-1 triggered SRS signalling) by a request sent on PDCCH. However, this cannot be triggered during DRX active periods because the terminal device is not monitoring PDCCH. In principle, the base station may be configured to instruct a terminal device to send an aperiodic SRS using PDCCH signalling at the beginning of a DRX inactive period for the terminal device to allow a response to the previously-received uplink signalling to be scheduled later in the DRX inactive period when the SRS signalling has been received from the terminal device. However, this approach may result in the DRX inactive period being longer than desired to allow time for the signalling to be exchanged (in general a shorter On Duration Timer allows for greater power saving opportunities).

Thus, in accordance with some embodiments of the present disclosure, a terminal device is configured to automatically transmit SRS signalling to the base station around the beginning of the DRX inactive period in which it expects to receive downlink signalling in response to previous uplink signalling. This is schematically represented in FIG. 9.

Figure 9:
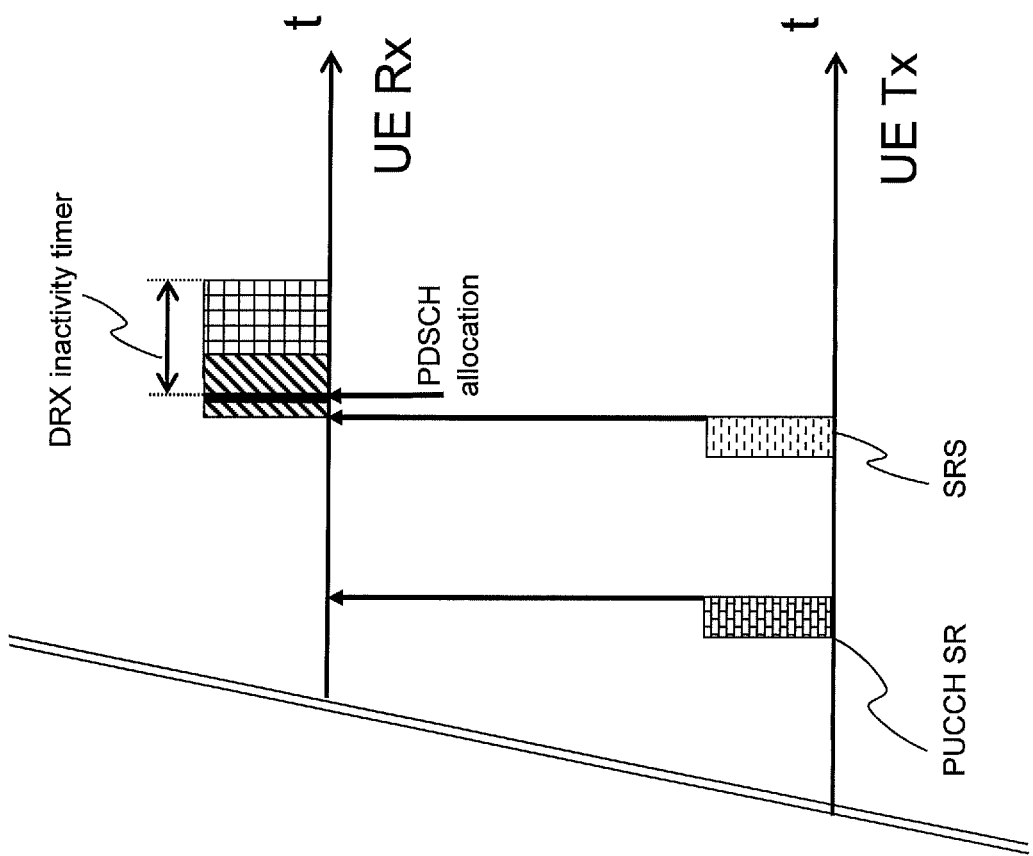

FIG. 9 is similar to, and will be understood, from the right hand part of FIG. 8 relating to the modified DRX procedures operating in relation to a PUCCH scheduling request from the terminal device. The left-hand part of FIG. 8 (relating to modified DRX procedures associated with acknowledgement signalling) is not repeated in FIG. 9 for the sake of clarity. The majority of the elements presented in FIG. 9 are the same as those presented in FIG. 8 and are not described again in the interest of brevity. However, FIG. 9 differs from FIG. 8 in that the terminal device is configured to transmit SRS signalling before the start of the DRX inactive period in which it expects to receive a response to the previously-sent PUCCH SR (i.e. in this example the DRX inactive period at the beginning of the DRX cycle following the PUCCH SR). For example, the terminal device may be configured to transmit SRS signalling in a time window defined relative to the beginning of the relevant DRX inactive period. The extent and location of the time window relative to the DRX inactive period may vary according to implementation and may be configured through RRC signalling. Furthermore, the time window may overlap with the DRX inactive period. For example, the terminal device may be configured to automatically send SRS signalling in the first subframe of the regular DRX inactive period in which it is expected to receive a response from the base station. Alternatively, the terminal device may be configured to automatically send SRS signalling in the subframe immediately before the start of the regular DRX inactive period in which it expects to receive a response from the base station. Thus, the time window for the terminal device to send SRS signalling may be contiguous with, or overlap with, the DRX inactive period. The timing may have a duration of one or more subframes, for example a may extend over a frame (10 subframes) defined relative to the beginning of the DRX inactive period.

Another approach may be for the terminal device to be configured to transmit SRS signalling in accordance with the timings normally associated with periodic reporting even when in DRX active mode. For example, the terminal device may be configured to send SRS signalling during DRX active periods if the terminal device is waiting for the next regular DRX inactive period after having transmitted a scheduling request. That is to say, rather than sending SRS signalling just prior to the DRX inactive period, as schematically represented in FIG. 9, the terminal device may send SRS signalling at whichever point(s) in time between the PUCCH SR uplink signalling and the start of the next DRX inactive period correspond with its periodic reporting cycle.

Apart from the new timing of the SRS signalling, the signalling itself may otherwise be conventional, e.g. In terms of its content and format. The base station may be configured to respond to the receipt of the SRS signalling from the terminal device and to make use of the information contained therein in making scheduling decisions in accordance with conventional techniques.

Figure 10:
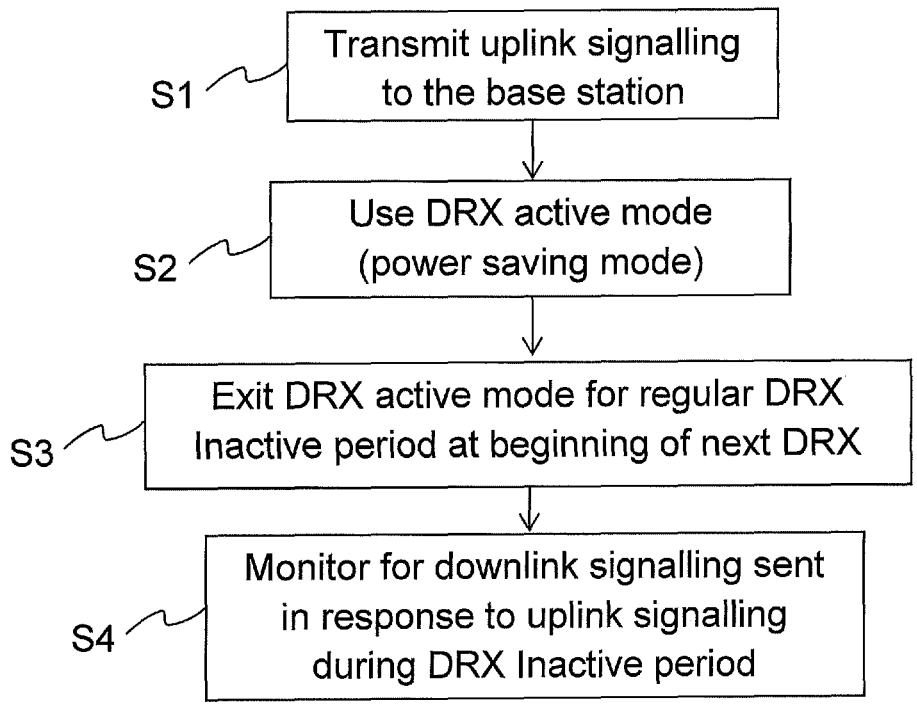
FIG. 10 is a flow diagram representing a method for operating a terminal device in a wireless telecommunications system in accordance with certain embodiments of the disclosure.

FIG. 10 is a flow diagram representing a method of operating the terminal device 508 in the wireless telecommunications system 500 represented in FIG. 7 in accordance with an embodiment of the present disclosure.

In step S1 the terminal device 508 transmits uplink signalling to the base station 504 which requires a downlink signalling response from the base station 508. The uplink signalling may, for example, be a negative acknowledgement of a previous PDSCH allocation or a scheduling request for uplink transmission resources.

In step S2 the terminal device 508 makes use of the DRX active mode (power saving mode) and does not monitor PDCCH for a period after the uplink signalling is transmitted in step S1 but before receiving any response to the uplink signalling.

In step S3 the terminal device 508 exits the DRX active mode (power saving mode) for the DRX inactive period at the beginning of the next repeat of its regular DRX cycle.

In step S4 the terminal device 508 monitors for downlink signalling sent by the base station 504 in response to the uplink signalling. In particular, the terminal device 508 may monitor PDCCH for downlink signalling associated with the base station's response to the previous uplink signalling in step S1.

Figure 11:
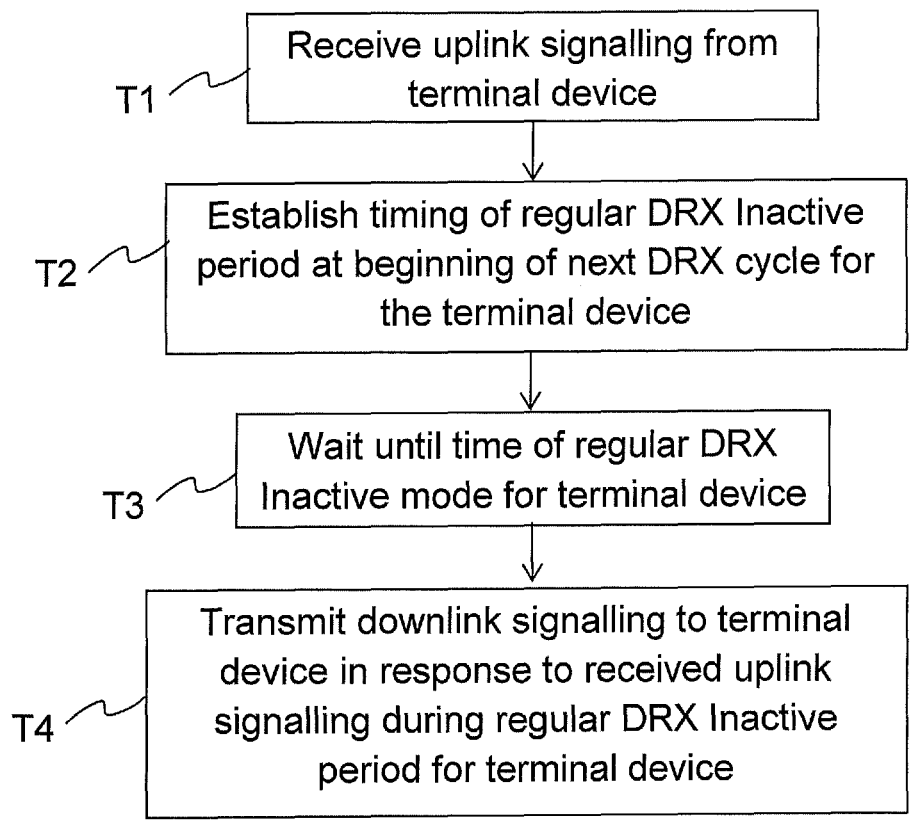
FIG. 11 is a flow diagram representing a method for operating a base station in a wireless telecommunications system in accordance with certain embodiments of the disclosure.

FIG. 11 is a flow diagram representing a method of operating a base station 504 in the wireless telecommunications system 500 represented in FIG. 7 in accordance with an embodiment of the present disclosure.

In step T1 the base station 504 receives uplink signalling from the terminal device 508 which requires a downlink signalling response from the base station 504. The uplink signalling may, for example, be a negative acknowledgement of a previous PDSCH allocation or a scheduling request for uplink transmission resources.

In step T2 the base station 504 determines the timing of a regular DRX inactive period at the beginning of a subsequent DRX cycle for the terminal device 504 based on the current DRX parameters.

In step T3 the base station 504 waits until the regular DRX inactive mode for the terminal device based on the timing established in step T2 before initiating any communications to the terminal device 508 in response to the uplink signalling received in step T1.

In step T4 the base station 504 transmits downlink signalling to the terminal device 508 in response to the uplink signalling.

It will be appreciated that the base station 504 executing the method of FIG. 11 with respect to the terminal device 508 may in parallel be communicating with other terminal devices in the network. For example, the base station 504 may also be communicating with the conventional terminal device 506 which does not implement modified DRX procedures in accordance with an embodiment of the disclosure using conventional DRX timings.

Thus there has been described a wireless telecommunications system that supports a DRX operating mode for communications between a base station and terminal device. This mode comprises a regular and repeating cycle of DRX inactive periods in which the terminal device monitors a downlink channel from the base station and DRX active periods during which the terminal device enters a power-saving mode and does not monitor the downlink channel. The terminal device transmits uplink signalling that is a trigger for subsequent downlink signalling. For example, the uplink signalling may comprise acknowledgement signalling for a previous downlink transmission or a request for uplink transmission resources. The base station receives the uplink signalling, determines the time of an upcoming DRX inactive period for the terminal device, and delays transmitting downlink signalling in response to the uplink signalling until the upcoming DRX inactive period. The terminal device enters the power saving mode after transmitting the uplink signalling and exits the power saving mode for the DRX inactive period to monitor the downlink channel for the downlink signalling.

Further particular and preferred aspects of the present disclosure are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the present disclosure is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Some respective features of the present disclosure are defined by the following two groups of numbered paragraphs:

First group of numbered paragraphs:

1. A method of operating a terminal device in a wireless telecommunications system which supports a discontinuous reception, DRX, operating mode, wherein the DRX mode comprises a repeating cycle of DRX inactive periods in which the terminal device monitors a downlink channel from a base station and DRX active periods during which the terminal device may enter a power saving mode and not monitor the downlink channel from the base station, the method comprising: transmitting uplink signalling to the base station, wherein the uplink signalling comprises a trigger for downlink signalling on the downlink channel to be transmitted by the base station to the terminal device, wherein the downlink signalling is associated with and transmitted in response to the uplink signalling; and waiting until a DRX inactive period of the repeating cycle of DRX inactive periods before monitoring the downlink channel for the downlink signalling transmitted in response to the uplink signalling.

2. The method of paragraph 1, wherein the uplink signalling comprises acknowledgment signalling associated with a previous transmission from the base station to the terminal device and the downlink signalling is related to a retransmission of the previous transmission.

3. The method of paragraph 1, wherein the uplink signalling comprises a request for transmission resources and the downlink signalling is related to an allocation of transmission resources for the terminal device.

4. The method of any of paragraphs 1 to 3, further comprising the terminal device making use of the power saving mode in a period between transmitting the uplink signalling and monitoring the downlink channel for the downlink signalling.

5. The method of any of paragraphs 1 to 4, further comprising the terminal device transmitting a report on radio channel conditions to the base station in a time window defined relative to the DRX inactive period in which the terminal device monitors the downlink channel for the downlink signalling transmitted in response to the uplink signalling.

6. The method of paragraph 5, wherein the time window is associated with the beginning of the DRX inactive period in which the terminal device monitors the downlink channel for the downlink signalling transmitted in response to the uplink signalling.

7. The method of any of paragraphs 1 to 6, wherein the repeating cycle of DRX inactive periods comprises DRX inactive periods repeating with a period associated with one or other of a DRX Cycle parameter and a DRX Short cycle parameter.

8. The method of paragraph 7, wherein the DRX Cycle parameter is an integer multiple of the DRX Short Cycle parameter.

9. The method of any of paragraphs 1 to 8, further comprising transmitting further uplink signalling to the base station, wherein the further uplink signalling comprises a trigger for further downlink signalling on the downlink channel to be transmitted by the base station to the terminal device, and wherein the further uplink signalling is transmitted with a characteristic that is different from the first-mentioned uplink signalling, and wherein the method further comprises the terminal device monitoring the downlink channel for the further downlink signalling without waiting for a DRX inactive period of the repeating cycle of DRX inactive periods.

10. A terminal device for use in a wireless telecommunications system which supports a discontinuous reception, DRX, operating mode, wherein the DRX mode comprises a repeating cycle of DRX inactive periods in which the terminal device monitors a downlink channel from a base station and DRX active periods during which the terminal device may enter a power saving mode and not monitor the downlink channel from the base station, wherein the terminal device comprises: a transceiver unit configured to transmit uplink signalling to the base station of the wireless telecommunications system, wherein the uplink signalling comprises a trigger for downlink signalling on the downlink channel to be transmitted by the base station to the terminal device, wherein the downlink signalling is associated with and transmitted in response to the uplink signalling; and a processor unit configured to control the transceiver unit to wait until a DRX inactive period of the repeating cycle of DRX inactive periods before monitoring the downlink channel for the downlink signalling transmitted in response to the uplink signalling.

11. The terminal device of paragraph 10, wherein the uplink signalling comprises acknowledgment signalling associated with a previous transmission from the base station to the terminal device and the downlink signalling is related to a retransmission of the previous transmission.

12. The terminal device of paragraph 10, wherein the uplink signalling comprises a request for transmission resources and the downlink signalling is related to an allocation of transmission resources for the terminal device.

13. The terminal device of any of paragraphs 10 to 12, wherein the controller unit is further configured to cause the terminal device to enter the power saving mode in a period between transmitting the uplink signalling and monitoring the downlink channel for the downlink signalling.

14. The terminal device of any of paragraphs 10 to 13, wherein the transceiver unit is further configured to transmit a report on radio channel conditions to the base station in a time window defined relative to the DRX inactive period in which the terminal device is configured to monitor the downlink channel for the downlink signalling transmitted in response to the uplink signalling.

15. The terminal device of paragraph 14, wherein the time window is associated with the beginning of the DRX inactive period in which the terminal device monitors the downlink channel for the downlink signalling transmitted in response to the uplink signalling.

16. The terminal device of any of paragraphs 10 to 15, wherein the repeating cycle of DRX inactive periods comprises DRX inactive periods repeating with a period associated with one or other of a DRX Cycle parameter and a DRX Short cycle parameter.

17. The terminal device of paragraph 16, wherein the DRX Cycle parameter is an integer multiple of the DRX Short Cycle parameter.

18. The terminal device of any of paragraphs 10 to 17, wherein the transceiver is further configured to transmit further uplink signalling to the base station of the wireless telecommunications system, wherein the further uplink signalling comprises a trigger for further downlink signalling on the downlink channel to be transmitted by the base station to the terminal device, wherein the further downlink signalling is associated with and transmitted in response to the further uplink signalling; and wherein the further uplink signalling is transmitted with a characteristic that is different from the first-mentioned uplink signalling; and wherein the processor unit is further configured to control the transceiver unit to monitor the downlink channel for the further downlink signalling without waiting for a DRX inactive period of the repeating cycle of DRX inactive periods.

19. A wireless telecommunications system comprising the terminal device of any of paragraphs 10 to 18, and a base station.

Second group of numbered paragraphs:

1. A method of operating a base station in a wireless telecommunications system which supports a discontinuous reception, DRX, operating mode for terminal devices, wherein the DRX mode comprises a repeating cycle of DRX inactive periods in which terminal devices monitor a downlink channel from the base station and DRX active periods during which terminal devices do not monitor the downlink channel from the base station, the method comprising: receiving uplink signalling from a terminal device, wherein the uplink signalling comprises a trigger for downlink signalling on the downlink channel to be transmitted by the base station to the terminal device, wherein the downlink signalling is associated with and transmitted in response to the uplink signalling; and waiting until a DRX inactive period of the repeating cycle of DRX inactive periods for the terminal device before transmitting the downlink signalling in response to the uplink signalling.

2. The method of paragraph 1, wherein the uplink signalling comprises acknowledgment signalling associated with a previous transmission from the base station to the terminal device and the downlink signalling is related to a retransmission of the previous transmission.

3. The method of paragraph 1, wherein the uplink signalling comprises a request for transmission resources and the downlink signalling is related to an allocation of transmission resources for the terminal device.

4. The method of any of paragraphs 1 to 3, further comprising receiving from the terminal device a report on radio channel conditions in a time window defined relative to the DRX inactive period in which the downlink signalling is transmitted in response to the uplink signalling.

5. The method of paragraph 4, wherein the time window is associated with the beginning of the DRX inactive period in which the downlink signalling is transmitted in response to the uplink signalling.

6. The method of any of paragraphs 1 to 5, wherein the repeating cycle of DRX inactive periods comprises DRX inactive periods repeating with a period associated with one or other of a DRX Cycle parameter and a DRX Short cycle parameter.

7. The method of paragraph 6, wherein the DRX Cycle parameter is an integer multiple of the DRX Short Cycle parameter.

8. The method of any of paragraphs 1 to 7, further comprising receiving further uplink signalling from the terminal device, wherein the further uplink signalling comprises a trigger for further downlink signalling on the downlink channel to be transmitted by the base station to the terminal device, wherein the further uplink signalling is associated with a characteristic that is different from the first-mentioned uplink signalling, and wherein the method further comprises transmitting the further downlink signalling in response to the further uplink signalling without waiting until a DRX inactive period of the repeating cycle of DRX inactive periods.

9. The method of any of paragraphs 1 to 8, wherein the method further comprises receiving uplink signalling from a further terminal device, wherein the uplink signalling received from the further terminal device comprises a trigger for downlink signalling on the downlink channel to be transmitted by the base station to the further terminal device, wherein the downlink signalling for the further terminal device is associated with and transmitted in response to the uplink signalling received from the further terminal device; and transmitting the downlink signalling for the further terminal device in response to the uplink signalling received from the further terminal without waiting until a DRX inactive period of the repeating cycle of DRX inactive periods for the further terminal device.

10. The method of paragraph 9, wherein the first-mentioned terminal device is a member of a first class of terminal device and the further terminal device is a member of a second class of terminal device which is different from the first class of terminal device.

11. A base station for use in a wireless telecommunications system which supports a discontinuous reception, DRX, operating mode for communications terminal devices, wherein the DRX mode comprises a repeating cycle of DRX inactive periods in which terminal devices monitor a downlink channel from the base station and DRX active periods during which terminal devices do not monitor the downlink channel from the base station, wherein the base station comprises: a transceiver unit configured receive uplink signalling from a terminal device, wherein the uplink signalling comprises a trigger for downlink signalling on the downlink channel to be transmitted by the base station to the terminal device, wherein the downlink signalling is associated with and transmitted in response to the uplink signalling; and a processor unit configured to control the transceiver unit to wait until a DRX inactive period of the repeating cycle of DRX inactive periods for the terminal device before transmitting the downlink signalling in response to the uplink signalling.

12. The base station of paragraph 11, wherein the uplink signalling comprises acknowledgment signalling associated with a previous transmission from the base station to the terminal device and the downlink signalling is related to a retransmission of the previous transmission.

13. The base station of paragraph 11, wherein the uplink signalling comprises a request for transmission resources and the downlink signalling is related to an allocation of transmission resources for the terminal device.

14. The base station of any of paragraphs 11 to 13, wherein the transceiver unit is further configured to receive from the terminal device a report on radio channel conditions in a time window defined relative to the DRX inactive period in which the downlink signalling is transmitted in response to the uplink signalling.

15. The base station of paragraph 14, wherein the time window is associated with the beginning of the DRX inactive period in which the downlink signalling is transmitted in response to the uplink signalling.

16. The base station of any of paragraphs 11 to 15, wherein the repeating cycle of DRX inactive periods comprises DRX inactive periods repeating with a period associated with one or other of a DRX Cycle parameter and a DRX Short cycle parameter.

17. The base station of any of paragraphs 11 to 16, wherein the transceiver is further configured to receive further uplink signalling from the terminal device, wherein the further uplink signalling comprises a trigger for further downlink signalling on the downlink channel to be transmitted by the base station to the terminal device, wherein the further uplink signalling is associated with a characteristic that is different from the first-mentioned uplink signalling, and wherein the processor unit is further configured to control the transceiver unit to transmit the further downlink signalling in response to the further uplink signalling without waiting until a DRX inactive period of the repeating cycle of DRX inactive periods for the terminal device.

18. The base station of any of paragraphs 11 to 17, wherein transceiver is further configured to receive uplink signalling from a further terminal device, wherein the uplink signalling from the further terminal device comprises a trigger for downlink signalling on the downlink channel to be transmitted by the base station to the further terminal device, wherein the downlink signalling for the further terminal device is associated with and transmitted in response to the uplink signalling received from the further terminal device; and the processor unit is further configured to control the transceiver unit to transmit the downlink signalling for the further terminal device in response to the uplink signalling received from the further terminal without waiting until a DRX inactive period of the repeating cycle of DRX inactive periods for the further terminal device.

19. The base station of paragraph 18, first-mentioned terminal device is a member of a first class of terminal device and the further terminal device is a member of a second class of terminal device which is different from the first class of terminal device.

20. A wireless telecommunications system comprising the base station of any of paragraphs 11 to 19 and a terminal device.

REFERENCES

[1] ETSI TS 122 368 V10.530 (2011 July)/3GPP TS 22.368 version 10.5.0 Release 10

[2] Holma H. and Toskala A, "LTE for UMTS OFDMA and SC-FDMA based radio access", John Wiley and Sons, 2009

[3] ETSI TS 136 331 V11.3.0 (2013 April)/3GPP TS 36.331 version 11.3.0 Release 11

[4] ETSI TS 136 321 V11.2.0 (2013 April)/3GPP TS 36.321 version 11.2.0 Release 11

What is claimed is:

1. A method of operating a terminal device in a wireless telecommunications system which supports a discontinuous reception (DRX) operating mode, wherein the DRX mode comprises a repeating cycle of DRX inactive periods in which the terminal device monitors a downlink channel from a base station and DRX active periods during which the terminal device may enter a power saving mode and not monitor the downlink channel from the base station, the method comprising:

transmitting uplink signalling to the base station, wherein
the uplink signalling comprises a request for transmission resources as a trigger for downlink signalling on the downlink channel to be transmitted by the base station to the terminal device,
the uplink signalling further comprises acknowledgement signalling associated with a previous transmission from the base station to the terminal device,
the downlink signalling is related to an allocation of the transmission resources for the terminal device associated with and transmitted in response to the uplink signalling,
the downlink signalling is further related to a retransmission of the previous transmission,
the base station is configured to delay transmission of the downlink signalling to the terminal device until a subsequent DRX inactive period of the terminal device, and
the terminal device is configured to delay monitoring of the downlink channel for the downlink signalling from the base station until the subsequent DRX inactive period of the terminal device;

initializing a DRX active period after transmitting the uplink signalling and prior to monitoring the downlink channel for the downlink signalling from the base station, wherein
the base station is configured to receive the uplink signalling before expiration of the DRX active period, and
the base station is configured to transmit the downlink signalling to the terminal device as a response to the request for transmission resources only after the expiration of the DRX active period and after initialization of the subsequent DRX inactive period by the terminal device;

initializing the subsequent DRX inactive period after the expiration of the DRX active period; and
monitoring the downlink channel for the downlink signalling after initializing the subsequent DRX inactive period.

2. The method of claim 1, further comprising:
entering the power saving mode in a period between transmitting the uplink signalling and monitoring the downlink channel for the downlink signalling.

3. The method of claim 1, further comprising:
transmitting a report on radio channel conditions to the base station in a time window defined relative to the subsequent DRX inactive period in which the terminal device monitors the downlink channel for the downlink signalling transmitted in response to the uplink signalling.

4. The method of claim 3, wherein the time window is associated with the beginning of the subsequent DRX inactive period in which the terminal device monitors the downlink channel for the downlink signalling transmitted in response to the uplink signalling.

5. The method of claim 1, wherein the repeating cycle of DRX inactive periods comprises DRX inactive periods repeating with a period associated with one or other of a DRX Cycle parameter and a DRX Short cycle parameter.

6. The method of claim 5, wherein the DRX Cycle parameter is an integer multiple of the DRX Short Cycle parameter.

7. The method of claim 1, further comprising:
transmitting further uplink signalling to the base station, wherein the further uplink signalling comprises a trigger for further downlink signalling on the downlink channel to be transmitted by the base station to the terminal device, and wherein the further uplink signalling is transmitted with a characteristic that is different from the first-mentioned uplink signalling; and
monitoring the downlink channel for the further downlink signalling without waiting for a DRX inactive period of the repeating cycle of DRX inactive periods.

8. The method of claim 1, further comprising:
transmitting a report on radio channel conditions to the base station in a time window defined relative to the subsequent DRX inactive period in which the terminal device monitors the downlink channel for the downlink signalling transmitted in response to the uplink signalling;
transmitting further uplink signalling to the base station, wherein the further uplink signalling comprises a trigger for further downlink signalling on the downlink channel to be transmitted by the base station to the terminal device, and wherein the further uplink signalling is transmitted with a characteristic that is different from the first-mentioned uplink signalling; and
monitoring the downlink channel for the further downlink signalling without waiting for a DRX inactive period of the repeating cycle of DRX inactive periods.

9. The method of claim 1, further comprising:
transmitting a report on radio channel conditions to the base station in a time window defined relative to the subsequent DRX inactive period in which the terminal device monitors the downlink channel for the downlink signalling transmitted in response to the uplink signalling;
transmitting further uplink signalling to the base station, wherein the further uplink signalling comprises a trigger for further downlink signalling on the downlink channel to be transmitted by the base station to the terminal device, and wherein the further uplink signalling is transmitted with a characteristic that is different from the first-mentioned uplink signalling; and
monitoring the downlink channel for the further downlink signalling without waiting for a DRX inactive period of the repeating cycle of DRX inactive periods,
wherein the repeating cycle of DRX inactive periods comprises DRX inactive periods repeating with a period associated with one or other of a DRX Cycle parameter and a DRX Short cycle parameter.

10. A terminal device for use in a wireless telecommunications system which supports a discontinuous reception (DRX) operating mode, wherein the DRX mode comprises a repeating cycle of DRX inactive periods in which the terminal device monitors a downlink channel from a base station and DRX active periods during which the terminal device may enter a power saving mode and not monitor the downlink channel from the base station, the terminal device comprising:

a transceiver configured to transmit uplink signalling to the base station of the wireless telecommunications system, wherein
the uplink signalling comprises a request for transmission resources as a trigger for downlink signalling on the downlink channel to be transmitted by the base station to the terminal device,
the uplink signalling further comprises acknowledgement signalling associated with a previous transmission from the base station to the terminal device, the downlink signalling is related to an allocation of the transmission resources for the terminal device associated with and transmitted in response to the uplink signalling, the downlink signalling is further related to a retransmission of the previous transmission, the base station is configured to delay transmission of the downlink signalling to the terminal device until a subsequent DRX inactive period of the terminal device, and the terminal device is configured to delay monitoring of the downlink channel for the downlink signalling from the base station until the subsequent DRX inactive period of the terminal device; and a processor configured to:

initialize a DRX active period after transmitting the uplink signalling and prior to controlling the transceiver to monitor the downlink channel for the downlink signalling from the base station, wherein the base station is configured to receive the uplink signalling before expiration of the DRX active period, and the base station is configured to transmit the downlink signalling to the terminal device as a response to the request for transmission resources only after the expiration of the DRX active period and after initialization of the subsequent DRX inactive period by the terminal device;

initialize the subsequent DRX inactive period after the expiration of the DRX active period; and control the transceiver to monitor the downlink channel for the downlink signalling after initializing the subsequent DRX inactive period.

11. The terminal device of claim 10, wherein the processor is further configured to control the terminal device to enter the power saving mode in a period between transmitting the uplink signalling and monitoring the downlink channel for the downlink signalling.

12. The terminal device of claim 10, wherein the transceiver is further configured to transmit a report on radio channel conditions to the base station in a time window defined relative to the subsequent DRX inactive period in which the terminal device is configured to monitor the downlink channel for the downlink signalling transmitted in response to the uplink signalling.

13. The terminal device of claim 12, wherein the time window is associated with the beginning of the subsequent DRX inactive period in which the terminal device monitors the downlink channel for the downlink signalling transmitted in response to the uplink signalling.

14. The terminal device of claim 10, wherein the repeating cycle of DRX inactive periods comprises DRX inactive periods repeating with a period associated with one or other of a DRX Cycle parameter and a DRX Short cycle parameter.

15. The terminal device of claim 14, wherein the DRX Cycle parameter is an integer multiple of the DRX Short Cycle parameter.

16. The terminal device of claim 10, wherein the transceiver is further configured to transmit further uplink signalling to the base station of the wireless telecommunications system, the further uplink signalling comprises a trigger for further downlink signalling on the downlink channel to be transmitted by the base station to the terminal device, the further downlink signalling is associated with and transmitted in response to the further uplink signalling, the further uplink signalling is transmitted with a characteristic that is different from the first-mentioned uplink signalling, and the processor is further configured to control the transceiver to monitor the downlink channel for the further downlink signalling without waiting for a DRX inactive period of the repeating cycle of DRX inactive periods.

17. A wireless telecommunications system, comprising:
the terminal device of claim 10; and
a base station.

\* \* \* \* \*